(12) United States Patent
Bednyak

(10) Patent No.: US 7,105,939 B2
(45) Date of Patent: Sep. 12, 2006

(54) ELECTRICAL GENERATOR HAVING AN OSCILLATOR CONTAINING A FREELY MOVING INTERNAL ELEMENT TO IMPROVE GENERATOR EFFECTIVENESS

(75) Inventor: Vladimir Bednyak, Vernon Hills, IL (US)

(73) Assignee: Motion Charge, Inc., Vernon Hills, IL (US)

( * ) Notice: Subject to any disclaimer, the term of this patent is extended or adjusted under 35 U.S.C. 154(b) by 0 days.

(21) Appl. No.: 10/837,869

(22) Filed: May 3, 2004

(65) Prior Publication Data

US 2004/0222637 A1    Nov. 11, 2004

Related U.S. Application Data

(60) Provisional application No. 60/468,917, filed on May 8, 2003.

(51) Int. Cl.
| | |
|---|---|
| F03B 13/12 | (2006.01) |
| F03B 13/10 | (2006.01) |
| E02B 9/08 | (2006.01) |
| E02B 3/06 | (2006.01) |
| H02P 9/04 | (2006.01) |

(52) U.S. Cl. .................. 290/42; 290/1 R; 290/53
(58) Field of Classification Search ........... 290/1 R, 290/42, 53
See application file for complete search history.

(56) References Cited

U.S. PATENT DOCUMENTS

| | | | | | |
|---|---|---|---|---|---|
| 2,317,983 | A | * | 5/1943 | Fischer | 74/604 |
| 3,204,110 | A | * | 8/1965 | Masuda | 290/42 |
| 3,231,749 | A | * | 1/1966 | Hinck, III | 290/53 |
| 3,250,140 | A | * | 5/1966 | Russell | 74/126 |
| 3,750,386 | A | * | 8/1973 | Harting | 368/166 |
| 3,802,181 | A | * | 4/1974 | Marquis | 368/134 |
| 4,110,630 | A | * | 8/1978 | Hendel | 290/53 |
| 4,211,401 | A | * | 7/1980 | Cunard | 472/119 |
| 4,260,901 | A | * | 4/1981 | Woodbridge | 290/42 |
| 4,317,047 | A | * | 2/1982 | de Almada | 290/53 |

(Continued)

FOREIGN PATENT DOCUMENTS

EP        618380 A1 * 10/1994

(Continued)

*Primary Examiner*—Darren Schuberg
*Assistant Examiner*—Pedro J. Cuevas
(74) *Attorney, Agent, or Firm*—Edward Etkin, Esq

(57) ABSTRACT

An apparatus and method for providing electrical energy to an electrical device by deriving the electrical energy from motion of the device. In one embodiment, the inventive apparatus includes a novel kinetic electrical power generator (KEPG) consisting of an inventive oscillating weight having an internal cavity with a freely movable acceleration element disposed therein, resulting in improved acceleration and oscillation capabilities and lower motion threshold for the weight, a system for converting the weight's oscillating motion into rotational motion, and an electromechanical transducer system for generating electrical energy from the rotational motion. The novel KEPG includes components for modifying the electrical energy for storing and/or feeding the modified electrical energy to the electrical device. Optional components may be included for using the modified electrical energy to recharge one or more rechargeable batteries used in an electric device. Alternate advantageous embodiments of the inventive apparatus include, but are not limited to: a KEPG with multiple inventive oscillating weights to increase velocity and frequency of desirable rotational motion, and a KEPG system utilizing multiple electrically coupled KEPG sub-systems.

42 Claims, 11 Drawing Sheets

U.S. PATENT DOCUMENTS

| | | | | |
|---|---|---|---|---|
| 4,396,852 A * | 8/1983 | Hunt | 310/329 |
| 4,423,334 A * | 12/1983 | Jacobi et al. | 290/53 |
| 4,527,951 A * | 7/1985 | Trier | 416/145 |
| 4,580,400 A * | 4/1986 | Watabe et al. | 60/398 |
| 4,610,140 A * | 9/1986 | Thompson, Jr. | 60/506 |
| 4,612,768 A * | 9/1986 | Thompson, Jr. | 60/506 |
| 4,700,817 A * | 10/1987 | Kondo et al. | 188/380 |
| 4,748,338 A * | 5/1988 | Boyce | 290/53 |
| 4,781,023 A * | 11/1988 | Gordon | 60/506 |
| 4,785,678 A * | 11/1988 | McGugan et al. | 74/42 |
| 4,821,218 A * | 4/1989 | Potsch | 73/514.01 |
| 4,851,704 A * | 7/1989 | Rubi | 290/53 |
| 4,852,350 A * | 8/1989 | Krisko | 60/325 |
| 4,931,662 A * | 6/1990 | Burton | 290/42 |
| 5,136,173 A * | 8/1992 | Rynne | 290/53 |
| 5,252,786 A * | 10/1993 | Rinard | 181/122 |
| 5,268,881 A * | 12/1993 | Damm | 368/134 |
| 5,271,328 A * | 12/1993 | Boulais et al. | 102/207 |
| 5,460,099 A * | 10/1995 | Matsuhisa et al. | 105/148 |
| 5,552,657 A * | 9/1996 | Epstein et al. | 310/339 |
| 5,708,206 A * | 1/1998 | Anderson et al. | 73/514.21 |
| 5,778,797 A * | 7/1998 | Mutaguchi et al. | 105/149.1 |
| 5,833,545 A * | 11/1998 | Pinch et al. | 472/119 |
| 5,886,260 A * | 3/1999 | Anderson et al. | 73/514.21 |
| 5,941,692 A * | 8/1999 | Olney et al. | 417/233 |
| 5,960,718 A * | 10/1999 | Mutaguchi et al. | 105/149.1 |
| 6,020,653 A * | 2/2000 | Woodbridge et al. | 290/53 |
| 6,035,787 A * | 3/2000 | Mutaguchi et al. | 105/149.1 |
| 6,172,426 B1 * | 1/2001 | Galich | 290/1 R |
| 6,454,143 B1 * | 9/2002 | Young | 222/565 |
| 6,700,248 B1 * | 3/2004 | Long | 310/80 |
| 6,791,205 B1 * | 9/2004 | Woodbridge | 290/53 |
| 6,825,574 B1 * | 11/2004 | Mooring | 290/1 R |
| 6,935,808 B1 * | 8/2005 | Dempster | 405/28 |

FOREIGN PATENT DOCUMENTS

| | | | |
|---|---|---|---|
| JP | 56052581 A | * | 5/1981 |
| JP | 06280934 A | * | 10/1994 |
| JP | 09053681 A | * | 2/1997 |
| JP | 10026553 A | * | 1/1998 |
| JP | 10257711 A | * | 9/1998 |
| JP | 2002142498 A | * | 5/2002 |
| JP | 2003227456 A | * | 8/2003 |

* cited by examiner

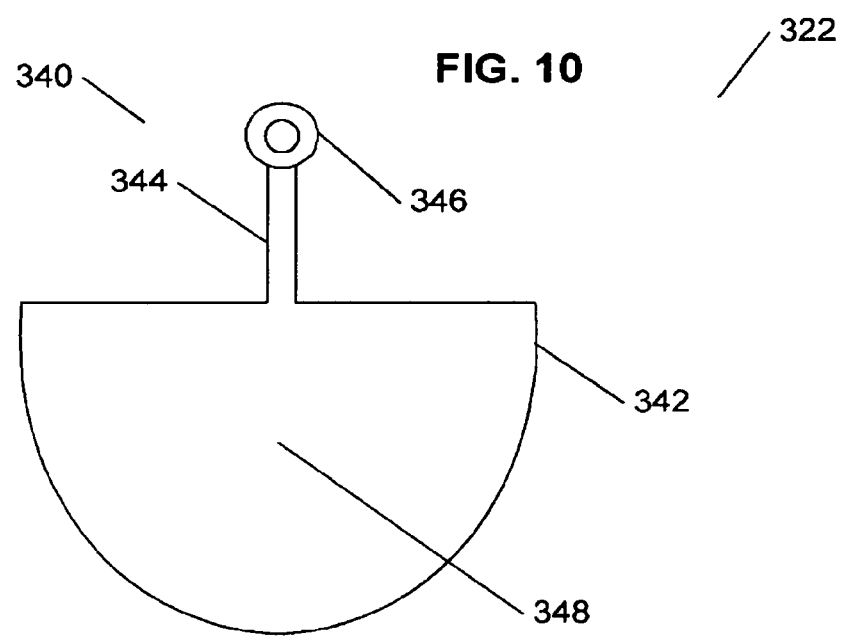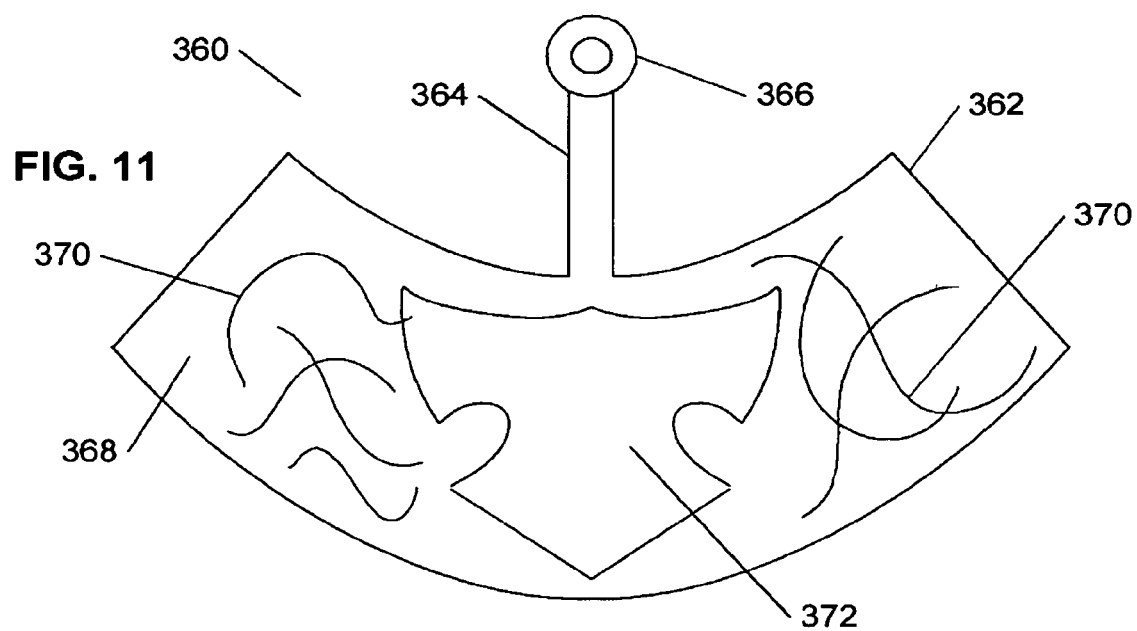

ELECTRICAL GENERATOR HAVING AN OSCILLATOR CONTAINING A FREELY MOVING INTERNAL ELEMENT TO IMPROVE GENERATOR EFFECTIVENESS

CROSS REFERENCE TO RELATED APPLICATIONS

The present patent application claims priority from the commonly assigned U.S. provisional patent application Ser. No. 60/468,917 entitled "Apparatus and Method for Generating Electrical Energy from Motion and From Routine Activities" filed May 8, 2003.

FIELD OF THE INVENTION

The present invention relates generally to an apparatus and method for generating electrical energy from motion, and more particularly to an apparatus and method for generating electrical energy from at least one kinetic electrical generator and processing the electrical energy to power electrical devices connected thereto, to recharge one or more rechargeable batteries, or to store the electrical energy for future use.

BACKGROUND OF THE INVENTION

The multitude of electrical and electronic devices in common use today, from cellular telephones to computers to lighting systems, all depend on a steady supply of electrical energy. Such a supply is not an issue when a device is connected to a constant source of electrical energy via a land electrical power line, for example through a power receptacle. However, portable electrical devices or devices located in areas without electrical power lines (for example marine craft, space vehicles, non-powered air vehicles, etc.), must acquire their electrical energy from batteries or through other electrical energy sources (solar panels, hydro-power generators, fuel cells, wind-power generators, etc.). Examples of portable electrical devices include, but are not limited to: miniature electrical devices (such as: an implantable cardiac device (pacemaker, defibrillator), a chronograph, a miniature surveillance device (remote mini-camera, concealable tracking device, motion detecting device), an electronic tag (RF, etc.), and small to medium electrical devices (such as a personal electronic device (a mobile telephone, a radio, a television, a personal digital assistant (PDA), a media player and/or recorder, a video or photo camera, a game console, binoculars, night vision goggles, a portable computer (notebook, laptop, or tablet computer), a portable data acquisition device (i.e. RF or barcode scanner), a portable medical diagnostic or treatment delivery device (e.g. blood pressure monitor, electrocardiogram machine, defibrillator, drug pump, etc.), a surveillance device (remote camera, tracking device, motion detecting device), a weapon or weapon accessory with electrical or electronic capabilities (e.g., a camera and/or scope on a rifle, a taser, a laser targeting sight, or a laser targeter), toys, and robotic devices.

In the past several decades, the proliferation of portable electrically powered devices, such as illustrated above, has created a great need for efficient and miniaturized sources of electrical energy. Utilization of ordinary disposable batteries (alkaline, etc.) greatly increases the cost of operation of such devices, especially because many electrical devices (for example, digital cameras) draw electrical energy in such a way as to quickly exhaust a conventional battery. In addition, users find frequent replacement of batteries and carrying spare batteries very inconvenient.

Therefore, in recent years, rechargeable batteries (such as Metal Oxide, NiCad, etc.) are typically used. Nevertheless, while rechargeable batteries, especially the latest currently available models, offer longer operational time and lower cost of operation, they are still finite sources of electrical energy and must be recharged relatively often. This is problematic for high utilization devices, such as PDAs, media recorders/players, portable telephones and laptop computers. Furthermore, because recharging involves connecting the device or its battery to a land power line, the recharging process limits the user's mobility. For that reason, many users are forced to carry one or more additional spare rechargeable batteries for their devices, and in some cases a recharging device or adapter (for example, when traveling). Other portable electrical devices, such as flashlights and the like, can also benefit from efficient long-lasting sources of electrical energy and sometimes rely on rechargeable batteries to lower operational costs with similar disadvantages as previously described electrical devices.

In some cases, where the use of rechargeable batteries is not practical or possible (such as in pacemakers and wrist chronographs), special extended duration non-rechargeable batteries (for-example, lithium batteries) are used. While such batteries may be replaceable, in the case of implantable medical devices, surgical intervention is necessary to extract the device. Furthermore, to maintain sterility, batteries in implantable medical devices are never changed, even when the device is extracted. Rather, the implantable device is disposed of, and replaced with a new one.

In addition, certain critical function devices, such as medical devices (e.g. pacemakers, drug pumps, etc.), environmental hazard (chemical, radiation, and/or biological) suits, or space vehicles (satellites, space shuttle, planetary robotic vehicles, extra-vehicular activity (EVA) suits, etc.) often require very reliable and sometimes redundant sources of electrical energy.

All types of batteries (rechargeable and otherwise), suffer from two additional disadvantages. First, most batteries utilize non-recyclable toxic and/or environmentally polluting materials in their construction, making disposal of used batteries a environmental danger. Second, all batteries generate heat during operation, requiring cooling in sensitive electronic equipment (such as in portable computers). The heat generation from batteries is a particular danger in military devices where the heat signature exposes the carrier of the device to enemy infra-red or other heat sensing surveillance or targeting equipment. This is particularly true of fuel cell batteries often used in military applications due to their inherent high capacity. For example, fuel cell batteries have operating temperatures that often exceed 100 degrees Fahrenheit.

To address these challenges, there has been some development in the field of portable generation of electrical energy that may be utilized to power an electrical device, to recharge the rechargeable batteries in a device, or both. Typically, previously known portable electrical generators involve some form of transduction of mechanical energy into electrical energy by implementation of the Faraday's Principle of Induction, in which motion of the generator (such as shaking or vibration) is translated into rotational movement of a coil and a magnetic rotor, at least partially disposed within the coil, relative to one another. This relative motion generates electrical energy at the coil caused by the rotation of the magnetic field of the rotor. The generated electrical energy is then typically rectified by a capacitor circuit to convert it to direct current (DC) power. The electrical energy may be used directly, stored, or routed to a rechargeable battery.

Some previously known kinetic-power generation (hereinafter "KEPG") systems are configured to derive electrical energy from relative linear motion of the coil and rotor—these systems require vigorous shaking motion to generate electrical energy and offer some advantages in that the desired electrical energy is relatively quickly generated. However, this approach requires direct dedicated action by the user to generate the energy that is difficult and impractical to sustain. Also, only small amounts of electrical energy may be practically generated in this manner. Furthermore, vigorous motion of certain electronic devices, such as laptop computers or medical devices, is highly undesirable.

In many previously known KEPG systems, an attempt has been made to utilize ordinary motion (such as walking, moving a limb, floating on waves in the water, etc.) to generate electrical energy in a manner that is transparent to the user. In most of these systems, translation of ordinary motion has been accomplished by utilizing an oscillating weight to convert relatively linear motion of the KEPG system into rotary motion of the rotor relative to the coil via a mechanical motion converter, such as a gear train. However, except for limited use in wrist chronographs, these systems have failed to achieve commercial success for a number of reasons. First, miniaturized KEPG systems must overcome a significant challenge in that the oscillating weight responsible for translating vibrational or semi-linear motion into desirable rotary motion must be of a very small size which makes it light, and thus limits its acceleration and range of angular motion during continuous operation, resulting in a decrease overall system performance proportional to the oscillating weight's size. Accordingly, previously known KEPG systems cannot provide sufficient amounts of electrical energy for tiny, small or medium electrical devices to justify their use.

In addition, due to the construction and operational characteristics of the previously known oscillating weights, the motion threshold—i.e. the minimum mechanical disturbance (in terms of the magnitude and directionality of inertial forces) that must be applied to the electrical device and transferred to the oscillating weight, to cause the weight to achieve sufficient repetitive angular motion to cause rotation of the rotor—is typically very high. Thus, to exceed the motion threshold, a device equipped with a previously known KEPG system must be subjected to significant mechanical disturbances to derive a meaningful benefit from the KEPG system. This is one of the reasons why the only commercially successful use of oscillating weight-based KEPG systems has been in wrist chronographs—the routine motion of an average person's wrist during typical daily activities continually provides a sufficient amount of mechanical disturbances of a magnitude that meets or exceeds a typical wrist chronograph-based KEPG system's motion threshold.

The challenge of the high motion threshold in previously known KEPG systems have also stymied their utilization in applications where the size of a KEPG system is less of an issue—for example, in marine power (buoy, marine craft, etc.) applications. In marine applications, moderately calm to slightly choppy waters—the most common marine conditions in the majority of the bodies of water, will typically fail to produce sufficient mechanical disturbances to the marine device or craft to exceed the motion threshold of most KEPG systems.

Thus, it would be desirable to provide an apparatus and method for efficiently generating electrical energy from motion, including routine motion. It would also be desirable to provide an apparatus and method for efficiently generating electrical energy utilizing an oscillating weight with superior acceleration and momentum characteristics relative to its size, to enable advantageous KEPG system utilization regardless of its size. It would further be desirable to provide an apparatus and method for generating electrical energy having a lower motion threshold than previously known KEPG systems.

BRIEF DESCRIPTION OF THE DRAWINGS

In the drawings, wherein like reference characters denote corresponding or similar elements throughout the various figures:

FIG. 10 is a schematic diagram of an exemplary seventh embodiment of the novel oscillating weight that may be utilized in the systems shown in FIGS. 1–3, and 12;

FIG. 11 is a schematic diagram of an exemplary eighth embodiment of the novel oscillating weight that may be utilized in the systems shown in FIGS. 1–3, and 12, including one or more decorative designs defined on the weight's surface, and also including one or more decorative elements positioned on the weight's surface.

SUMMARY OF THE INVENTION

Figure 1:
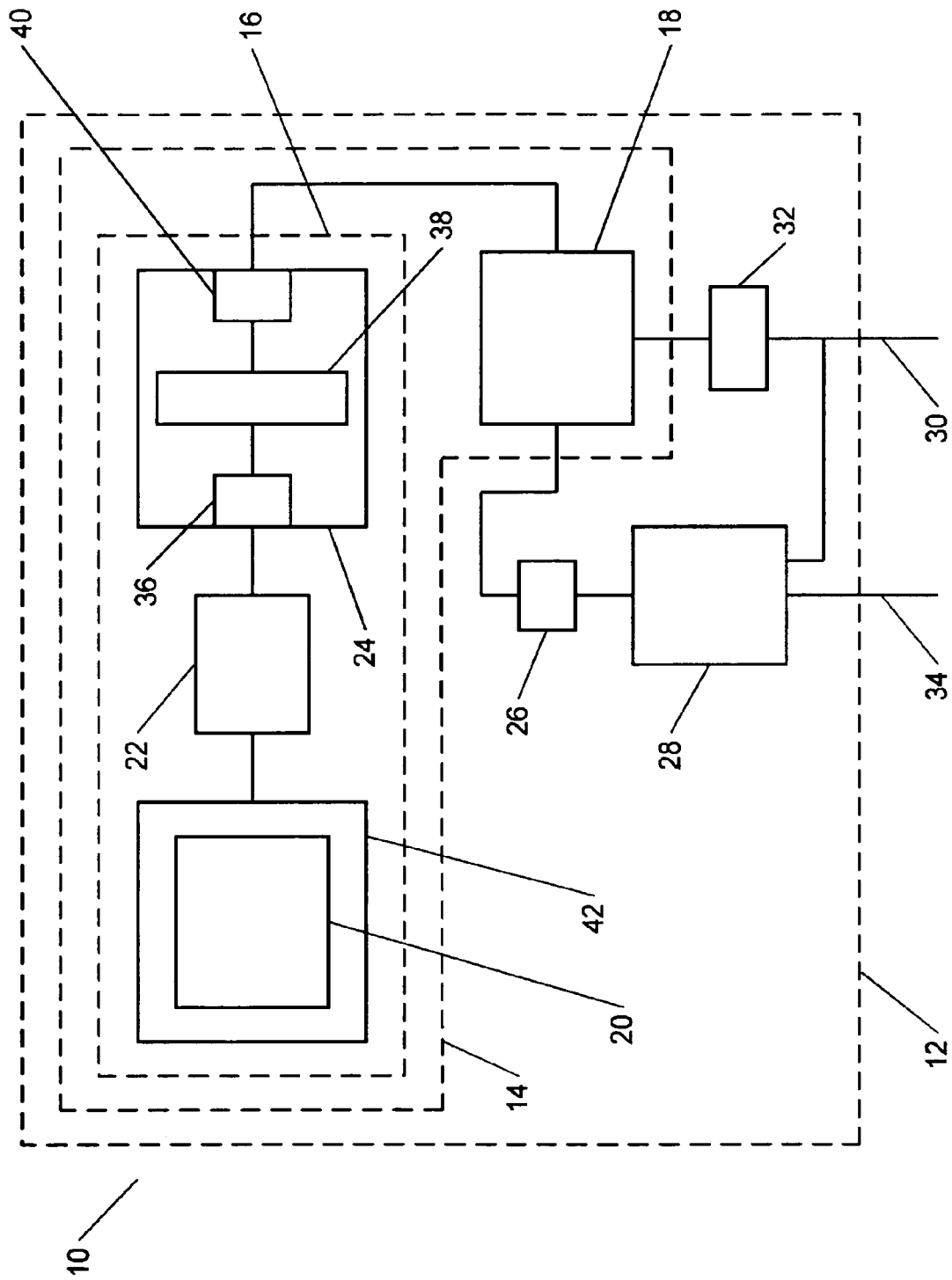
FIG. 1 is a schematic block diagram of an exemplary first embodiment of a kinetic power generating system (hereinafter, KEPG system) of the present invention, for generating, delivering, and/or storing electrical energy, the inventive KEPG system utilizing a novel oscillating weight with improved acceleration characteristics, and having a minimized motion threshold.

The present invention advantageously overcomes the drawbacks and disadvantages of previously known kinetic electrical power generators (hereinafter "KEPGs") by providing a KEPG utilizing a novel oscillating weight with improved acceleration and performance capabilities resulting in a significantly lower motion threshold than any previously known KEPG, even when the oscillating weight is of relatively small size. In addition, the novel oscillating weight of the present invention may be readily utilized, or adapted for use, in most conventional KEPGs to take advantage of other innovations in particular KEPGs, such as, for example, improved motion conversion assemblies or gear trains, and electrical energy processing and/or storage circuitry. The KEPG may also include an optional transparent or open area to enabling a view of operation of the oscillating weight for decorative purposes.

In the simplest embodiment, the inventive KEPG includes a support structure for retaining and supporting the various components of the KEPG and interconnections thereof, and an electrical energy generation component for generating electrical energy from motion of the KEPG, one or more power interfaces for delivering electrical energy to an external electrical device, and also may include one or more optional components, electrically connected between the electrical energy generation component and the power interface(s) such as optional electrical energy processing units for processing the generated electrical energy, and/or an optional electrical energy storage unit for storing generated electrical energy. The electrical energy generation component includes a transducer for generating electrical energy from rotational motion delivered thereto, and a rotational motion generation component, mechanically connected to the transducer, for generating rotational motion from motion of the KEPG, for delivery to the transducer. The rotational motion generation component includes the novel oscillating weight, for generating oscillating motion in response to motion of the KEPG, a pivot element, mechanically connected to the oscillating weight, for producing a reciprocating radial motion in response to the oscillating motion of the oscillating weight, and a motion conversion component, mechanically connected to the pivot element, for translating the reciprocating radial motion, delivered by the pivot element thereto, into rotational motion for delivery to the transducer.

The inventive KEPG may optionally utilize one or more oscillating weights and may also include optional components for processing (e.g. rectifying, transforming, etc.) the produced electrical energy, and an optional electrical energy storage unit for temporarily storing the processed electrical energy, as well as one or more power interfaces for delivering electrical energy to an external electrical device. In an exemplary second embodiment of the inventive KEPG, multiple coupled KEPG sub-systems are utilized for generating, delivering, and/or storing a greater amount of electrical energy than a single KEPG.

The key feature of the novel oscillating weight of the present invention, advantageously utilized in the various embodiments of the present invention, is an internal cavity defined along the length of the weight and in the same plane as the direction of the weight's oscillating motion, and a freely moving acceleration element located in the cavity, that moves within the cavity from one end of the weight to another, in response to a mechanical disturbance (i.e. motion) applied to the oscillating weight. The independent motion of the acceleration element greatly increases the acceleration, the likelihood, the duration, and the momentum of the oscillating weight and enables a greater range of radial motion as well as a significantly lower motion threshold for the weight.

The oscillating weight includes an elongated connector for connecting the weight body to a pivot element to deliver reciprocating radial motion to a motion conversion component. The length of the connector should be selected along with the size of the weight's body to maximize the acceleration capabilities and range of motion of the weight subject to the size constraints of the KEPG. The shape of the weight's body is preferably configured to maximize the effectiveness of the acceleration element and to elongate the internal cavity to provide the acceleration element with an available range of motion and to also enhance the overall acceleration capabilities of the weight. Generally semicircular (or equivalent) shapes have been shown to provide desirable characteristics.

In the various embodiments of the novel oscillating weight, the acceleration element may be one, or a combination or two or more, of the following: a heavy fluid (e.g., mercury); a mixture of dense substance grains; one or more rolling elements (e.g., disc, sphere) of one or more sizes, and composed of a dense substance; or one or more sliding elements also composed of a dense substance, where the dense substance may be one or more of the following materials: metal, glass, crystal, ceramic, or stone.

If the inventive KEPG is supplied with the optional viewing area for viewing operation of the oscillating weight, that is visible to the user (for example, through a corresponding viewing area in the housing of an electrical device in which the inventive KEPG is installed, the novel oscillating weight body may include one or more decorative elements positioned on it's surface and/or one or more decorative designs defined thereon.

A co-pending commonly assigned U.S. patent application entitled "APPARATUS AND METHOD FOR PROVIDING ELECTRICAL ENERGY GENERATED FROM MOTION TO AN ELECTRICALLY POWERED DEVICE", which is incorporated herein by reference in its entirety, discloses and provides a wide variety of novel electrical devices, electrical device accessories, and articles and/or structures incorporating one or more electrical devices that advantageously utilize one or more KEPG subsystems to provide, in response to motion, electrical energy to functional components thereof, in addition to, or instead of, other electrical energy sources, and, if the other energy sources are rechargeable, to selectively or continuously recharge the energy sources.

To demonstrate a novel implementation of the inventive KEPG, an exemplary embodiment of a basic novel electrical device is provided. The novel electrical device includes one or more functional components, a KEPG connected to at least one functional component, and an optional rechargeable battery system. The KEPG may provide electrical energy generated from motion of the device directly to the connected functional component(s), to the rechargeable power supply (e.g., battery system) to recharge the supply, or to both the functional component(s) and the power supply.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PREFERRED EMBODIMENTS

The present invention relates to an advantageous apparatus and method for efficiently generating electrical energy from motion (including, but not limited to, semi-linear motion, vibration, multidirectional motion, oscillating motion, and any other type of mechanical disturbance), even if the apparatus is very small. The invention is also directed to a wide variety of electrical devices, accessories for electrical devices, and articles, structures and/or vehicles incorporating electrical devices and/or having interfaces capable of connecting to electrical devices.

Before describing the present invention in greater detail, it would be useful to discuss the reasons for failure of previously known motion-based power generation devices to achieve a meaningful commercial success.

There are two key challenges for any kinetic electrical power generator (hereinafter "KEPG") that relies on an oscillating weight to provide the reciprocating radial motion, in response to a mechanical disturbance exerted on the KEPG, that is later converted into desirable rotational motion used by the KEPG's transducer (e.g., a coil and magnetic rotor assembly) to generate electrical energy.

The first challenge, is the direct relationship of the size (and therefore mass and weight) of the oscillating weight to its efficiency, and thus to the efficiency of the KEPG system. In most portable electrical devices, available space is a great premium. Accordingly, the size of the oscillating weight must be significantly restricted, decreasing the weight's ability to gather and maintain momentum resulting in a lowered likelihood of the weight producing meaningful oscillating motion, and thus causing a corresponding significant decrease in KEPG efficiency. Typically, this efficiency decrease is sufficient to make utilization of a conventional KEPG impractical.

The second, and even more important challenge, is the magnitude of a motion threshold for a conventional KEPG's oscillating weight. Due to the construction and operational characteristics of a typical previously known oscillating weight, the motion threshold—i.e. the minimum mechanical disturbance (in terms of the magnitude and directionality of inertial forces) that must be applied to the electrical device and transferred to the oscillating weight, to cause the weight to achieve sufficient repetitive angular motion to cause rotation of the rotor—is typically very high. Thus, to exceed the motion threshold, a device equipped with a previously known KEPG system must be subjected to significant mechanical disturbances to derive a meaningful benefit from the KEPG system. This is one of the reasons why the only commercially successful use of oscillating weight-based KEPG systems has been in wrist chronographs—the routine motion of an average person's wrist during typical daily activities continually provides a sufficient amount of mechanical disturbances of a magnitude that meets or exceeds a typical wrist chronograph-based KEPG system's motion threshold.

The inability of previously known KEPGs to overcome these challenges, resulted in the KEPGs only being commercially utilized in extremely limited niche applications, such as wrist chronographs. Attempts to utilize existing KEPGs in more demanding electrical devices (i.e. in virtually any electrical device other than a wrist chronograph) have met with failure.

The present invention successfully overcomes both of the above challenges by providing a KEPG utilizing a novel oscillating weight with improved acceleration and performance capabilities resulting in a significantly lower motion threshold than any previously known KEPG, even when the oscillating weight is of relatively small size. In addition, the novel oscillating weight of the present invention may be readily utilized, or adapted for use, in most conventional KEPGs to take advantage of other innovations in particular KEPGs, such as, for example, improved motion conversion assemblies or gear trains, and electrical energy processing and/or storage circuitry.

It should be noted that, aside from the novel oscillating weight, other components that may be utilized in the KEPG of the present invention are generally well known in the art. It fact, to further improve the performance of the inventive KEPG, it may be useful to select the most advantageous components for utilization therewith. Thus, there is no need to provide detailed descriptions or schematic drawings of such KEPG components as motion converters (e.g. gear trains that convert reciprocating radial motion into rotational motion), electromechanical transducers (such as coil and rotor assemblies), electrical energy processing circuits (such as rectifiers or transformers), or of electrical energy storage devices (such as capacitors or capacitor circuits). Accordingly, in the various embodiments of the present invention, shown and described below in conjunction with FIGS. 1–3, and FIG. 12, all KEPG components other than the novel embodiments of the novel oscillating weight, are described in a general manner and in terms of their desired functionality. One skilled in the art can readily select such existing components for use with the novel KEPG as a matter of design choice or convenience without departing from the spirit of the present invention.

It should also be noted that the FIGS. 1–3, and 12 of the drawings, showing the various embodiments of the present invention, are presented as schematic diagrams to describe and show the functional elements and components of the inventive embodiments and their interconnections, and are not meant to show or describe the actual or preferred positions of such elements or components, or of sizes or shapes of the components, unless specifically noted otherwise in the description of a figure. Accordingly, as a matter of design choice and without departing from the spirit of the invention, one skilled in the art can readily select, configure, and position the various elements and components of any embodiment of the present invention, as long as the inventive functional requirements and interconnections, as well as any limitations on components or positions thereof provided in conjunction with the descriptions of the embodiments, are adhered to.

As noted above, the key feature of the various functional embodiments of the present invention (shown in FIGS. 1–3, and FIG. 12), is the inventive KEPG utilizing the novel oscillating weight. In essence the novel oscillating weight achieves its superior and advantageous characteristics through an interior hollow cavity with a freely mobile acceleration element disposed therein. When a KEPG with the novel oscillating weight is subjected to motion, the movement of the acceleration element within the cavity greatly increases the acceleration and angular range of motion of the oscillating weight, resulting in a greater response to the motion of the KEPG and thus lowering the motion threshold as well as increasing the overall efficiency of the KEPG. Because of the action of the acceleration element, the novel oscillating weight provides a performance that is vastly superior to conventional weights that are of significantly greater size, and thus enable advantageous utilization of the inventive KEPG in applications that were previously impractical.

Referring now to FIG. 1, an exemplary first embodiment of a KEPG of the present invention, for generating, delivering, and/or storing electrical energy, is shown as a KEPG 10. The KEPG 10 includes a support structure 12 for retaining and supporting the various components of the KEPG 10 and interconnections thereof, and an electrical energy generation component 14 for generating electrical energy from motion of the KEPG 10, one or more power interfaces 30, 34 for delivering electrical energy to an external electrical device (not shown), and also may include one or more optional components, electrically connected between the electrical energy generation component 14 and the power interfaces 30, 34, such as optional electrical energy processing units 26, 32, and/or an optional electrical energy storage unit 28.

The support structure 12 may be-a completely or partially enclosed housing, or an open framework, for example, when the KEPG 10 is built into, and integrated with internal components of, an electrical device. The electrical energy generation component 14, includes a electromechanical transducer 18 for generating electrical energy from rotational motion delivered thereto, and a rotational motion generation component 16, mechanically connected to the transducer 18, for generating rotational motion from motion of the KEPG 10, for delivery to the transducer 18.

The transducer 18 may be any electromechanical device that implements the well known Faraday's principle of induction. For example, the transducer 18 may include a conductive coil ring or tube (e.g., a ring or a cylinder wrapped in conductive wire), and a magnetized rotor mounted therein (not shown) in such a manner as to enable radial rotation of the coil and rotor relative to one another, so that when rotational motion is delivered to the rotor or to the coil, their relative motion with respect to one another causes the coil to advantageously produce electrical energy.

The rotational motion generation component 16 includes an oscillating weight 20, for generating oscillating motion in response to motion of the KEPG 10, a pivot element 22, mechanically connected to the oscillating weight 20, for producing a reciprocating radial motion in response to the oscillating motion of the oscillating weight 20, and a motion conversion component 24, mechanically connected to the pivot element 22, for translating the reciprocating radial motion, delivered by the pivot element 22 thereto, into rotational motion for delivery to the transducer 18. The oscillating weight 20, is preferably capable of a high degree of acceleration relative to its size, a wide range of radial motion, and having a minimized motion threshold.

The support structure 12 may be supplied with an optional viewing area 42 for viewing operation of the oscillating weight 20, that may be made visible to the user (for example, through a corresponding viewing area in the housing of an electrical device in which the inventive KEPG is installed (not shown). In this case, oscillating weight 20 may include decorative features on its visible surface, as shown and described in greater detail below in connection with FIGS. 8–11.

Because the oscillating weight 20 is a key feature of the present invention, various advantageous exemplary embodiments thereof are described in greater detail below in connection with FIGS. 4A to 11.

The pivot element 22, may be a rod rotatably retained by a holding element (not shown) and connected to the motion conversion component 24 at one end and to the oscillating weight 20 at the other end, in such a manner that oscillating motion of the oscillating weight 20 produces reciprocating radial motion of the rod about its longitudinal axis. By way of example, the motion conversion component 24, may be a mechanical gear and/or spring assembly, having an exemplary input drive element 36 for receiving reciprocating radial motion from the pivot element 22, an exemplary gear and/or spring assembly 38 mechanically connected to the input drive element 36, that is configured and adapted for converting the reciprocating radial motion delivered by input drive element the into desirable rotational motion, and an exemplary output drive element 40, mechanically connected to the gear and/or spring assembly 38, for delivering the rotational motion from the assembly 38 to the transducer 18. Of course, a motion conversion mechanism of any other type or construction may be readily and advantageously utilized as the motion conversion component 24 as long as it is capable of translating reciprocating radial motion into rotational motion.

The KEPG 10 may be configured, as matter of design choice, to simply deliver generated electrical energy as it is produced by the electrical energy generation component 14 to an external electrical device for external processing (i.e. rectification, transformation, etc.) in which case a power interface 30, electrically connected to the transducer 18, may be utilized. The power interface 30 may be any electrical connector, capable of transmitting electrical energy therein.

Optionally, the KEPG 10 may be configured to process the generated electrical energy internally before delivering it to an outside electrical device via the power interface 30. In this case, the optional electrical energy processing unit 32 is electrically connected between the transducer 18 and the power interface 30. The electrical energy processing unit 32 may include various electrical energy processing functionality as a matter of design choice. For example, the processing unit 32 may include rectification circuitry (not shown) for rectifying the received electrical energy to produce direct current (DC) electrical energy, or transformer circuitry (not shown) for changing the voltage of the electrical energy to a desirable magnitude. Other forms of electrical energy processing may be implemented in the processing unit 32 as a matter of design choice or necessity.

Alternately, or additionally, the KEPG 10 may be configured to temporarily store the generated electrical energy for future delivery to an external electrical device. In this case, the optional electrical energy processing unit 26 is electrically connected between the transducer 18 and the electrical energy storage unit 28, which in turn is connected to the power interface 30. Optionally, the electrical energy storage unit 28 may be connected to an optional individual power interface 34 (substantially identical to the power interface 30). Alternately, the electrical energy processing units 26, 32 may be implemented as a single device electrically connected to both the transducer 18, and to the electrical energy storage unit 28.

The electrical energy storage unit 28 may be any electrical energy storage device or assembly, such as one or more capacitors, for temporary low-loss storage of electrical energy. In one configuration, the electrical energy storage unit 28 may output electrical energy to one of the power interfaces 30, 34 when it reaches its maximum storage capacity, and then continue the cycle of accumulation of electrical energy from the transducer 18 and subsequent release.

Alternately, the electrical energy storage unit 28 may deliver the stored electrical energy to an outside electrical device only in response to the device drawing or otherwise signaling a request for that energy. For example, if the KEPG 10 is implemented in a mission-critical device, such as a pacemaker, the device may be configured to draw on the electrical energy stored in the electrical energy storage unit 28 only when the device's primary source of electrical energy fails.

Figure 2:
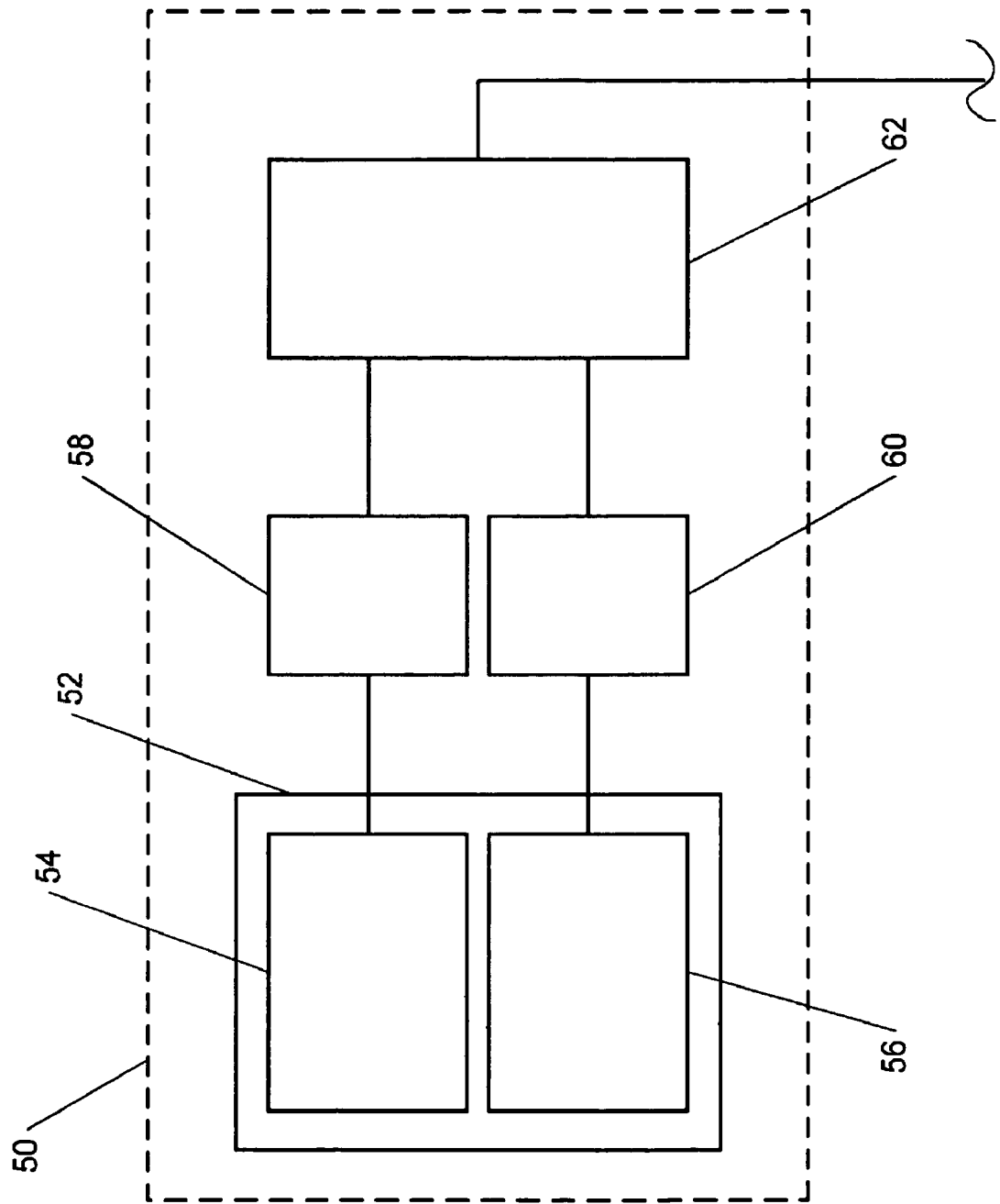
FIG. 2 is a schematic block diagram of an alternate embodiment of a rotational motion generation component of the KEPG system of FIG. 1, that supplies rotational motion to an electromechanical transducer, that includes more than one novel oscillating weight.

Thus, in its various alternate configurations, the KEPG 10 may provide a wide variety of outputs:

- unprocessed electrical energy from the power interface 30, as it is generated by the electrical energy generation component 14;
- processed electrical energy from the power interface 30, as it is generated by the electrical energy generation component 14 and processed by the electrical energy processing unit 32;
- processed electrical energy from the power interface 30, received from the electrical energy storage unit 28, that was previously generated by the electrical energy generation component 14 and processed by the electrical energy processing unit 26;
- unprocessed electrical energy from the power interface 30, as it is generated by the electrical energy generation component 14; and processed electrical energy from the power interface 30, received from the electrical energy storage unit 28, that was previously generated by the electrical energy generation component 14 and processed by the electrical energy processing unit 26;
- processed electrical energy from the power interface 30, as it is generated by the electrical energy generation component 14 and processed by the electrical energy processing unit 32, and processed electrical energy from the power interface 30, received from the electrical energy storage unit 28, that was previously generated by the electrical energy generation component 14 and processed by the electrical energy processing unit 26;

Referring now to FIG. 2, an alternate embodiment of the rotational motion generation component 16 of the KEPG 10 of FIG. 1, is shown as a rotational motion generation component 50 that utilizes multiple oscillating weights for improved production of rotational motion. The rotational motion generation component 50 includes an oscillating weight system 52 with two or more oscillating weights 54, 56 (substantially similar to the oscillating weight 20 of FIG. 1) that are mechanically connected to corresponding individual pivot elements 58, 60 (substantially similar to the pivot element 22 of FIG. 1), and that are mechanically connected to a motion conversion unit 62 for aggregating reciprocating radial motion received from the pivot elements 58, 60 and for converting the aggregated motion into rotational motion. The motion conversion unit 62 preferably includes the functionality of the motion conversion unit 24 of FIG. 1 in addition to a mechanism configured fro aggregating reciprocating motion received from two or more pivot elements 58, 60. One of the advantages of utilizing multiple oscillating weights, is a greatly increased likelihood of desirable oscillation motion by at least one of the weights, and thus a greater likelihood of rotational motion generated by the motion conversion unit 62, resulting in generation of electrical energy by the transducer 18 (FIG. 1).

While only two oscillating weights 54, 56 are shown in FIG. 2, it should be understood that three or more oscillating weighs with a corresponding quantity of pivot elements may be readily utilized as a matter of design choice to improve the performance of the rotational motion generation component 50, limited only by the design considerations, such as a desired size and/or other physical constraints, thereof.

Figure 3:
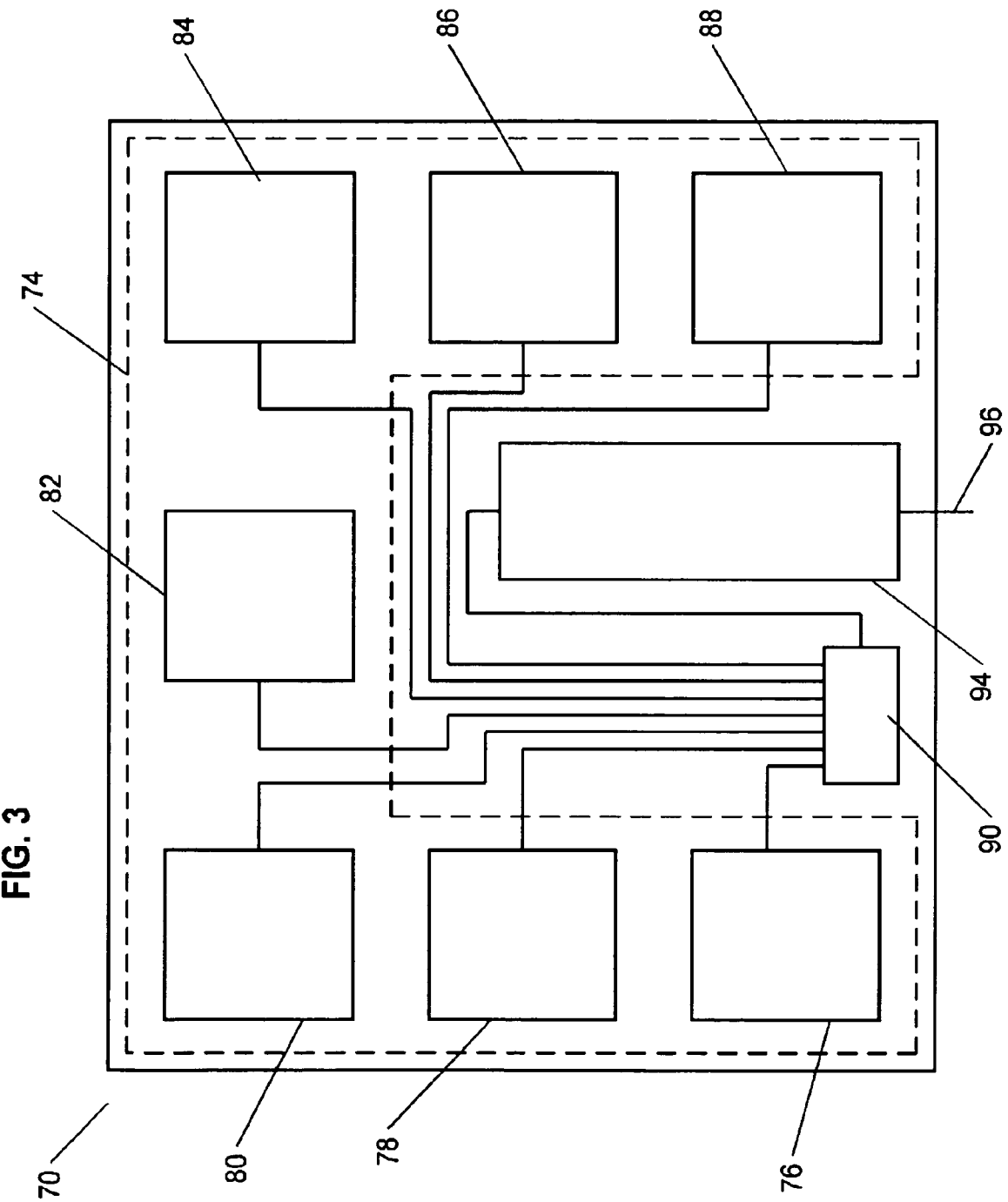
FIG. 3 is a schematic block diagram of an exemplary second embodiment of the inventive KEPG system, utilizing multiple coupled KEPG sub-systems for generating, delivering, and/or storing electrical energy.

Referring now to FIG. 3, an exemplary second embodiment of the inventive KEPG, utilizing multiple coupled KEPG sub-systems, is shown as a KEPG 70. The KEPG 70 includes a support structure 72, such as a housing or a framework, a KEPG system 74 that includes two or more KEPG sub-systems (shown as KEPG subsystems 76–88, by way of example), an electrical aggregating unit 90, for aggregating electrical energy received from the KEPG system 74 (i.e., from KEPG sub-systems 76–88), and optionally for processing the aggregated electrical energy, and a power interface 92 for delivering electrical energy to an external electrical device (not shown). The KEPG 70 may also include an optional electrical energy storage unit 94 electrically connected between the electrical aggregating unit 90 and an optional power interface 96.

While the KEPG system 74 is shown as having seven KEPG sub-systems 76–88 in FIG. 3, it should be understood that any number of two or more KEPG sub-systems may be readily utilized as a matter of design choice to improve the performance of the KEPG 70, limited only by the design considerations, such as a desired size and/or other physical constraints, thereof.

Each of the KEPG sub-systems 76–88, is preferably substantially similar to the KEPG 10 of FIG. 1, but other types of KEPGs may be utilized as well. The electrical aggregating unit 90 may include any type of electrical circuitry configured for simultaneously receiving electrical energy from multiple sources and aggregating the received energy before forwarding the aggregated energy to another component (i.e., to the power interface 92, or to the optional electrical energy storage unit 94).

The configuration of the electrical aggregating unit 90 also depends on the configuration of the KEPG sub-systems 76–88. For example, if the KEPG sub-systems 76–88 are configured without electrical energy processing (e.g. without electrical energy processing units 26 and/or 32 of FIG. 1), the electrical aggregating unit 90 may include an electrical energy processing unit (substantially similar to the processing units 26 and/or 32 of FIG. 1) for processing the aggregated unprocessed electrical energy received therefrom.

The optional electrical energy storage unit 94 is substantially similar to the electrical energy storage unit 28 of FIG. 1, except that it may be of larger capacity to provide electrical energy storage for energy received from multiple KEPGs. Similarly, the electrical energy storage unit 94 is connected to the optional power interface 96 for selectively delivering stored electrical energy to an external electrical device (not shown).

The KEPG 70 is capable of providing a greater amount of electrical energy than a single KEPG 10 of FIG. 1. In addition, optionally, the individual KEPG sub-systems may be located outside the support structure 72, and distributed throughout an electrical device, or another structure, to maximize the mechanical disturbance applied to each KEPG sub-system during motion. It should be noted that the KEPG 70 may be readily substituted for the KEPG 10, subject to size considerations.

The KEPG 10 and KEPG 70 may be readily utilized in virtually any electrical device, electrical device accessory, and/or article or structure incorporating one or more electrical devices. An exemplary embodiment of a novel electrical device utilizing the KEPG 10 or KEPG 70 subsystem in is shown and described below in connection with FIG. 12.

Because the KEPGs 10, 70 include oscillating weights 20 that oscillate in a particular coordinate plane, when utilizing the KEPGs 10, 70 in an electrical device, it would be advantageous to position and orient them in such a manner as to maximize the likelihood of motion that exceeds the motion threshold. For example, if the KEPGs 10, 70 are utilized in a floating buoy to power electrical lights, the KEPGs 10, 70 should be positioned near the top of the buoy and oriented with the weight 20 plane of motion perpendicular to the water surface, as that area has the greatest likelihood and range of side-to-side motion that would result in desirable oscillating motion of the weight(s) 20.

Referring now to FIGS. 4A–11, various embodiments of the novel oscillating weight (e.g., oscillating weight 20 of FIG. 1) are shown. Before describing each embodiment in greater detail, it would be useful to provide an overview of the features and elements common to all embodiments of the novel oscillating weight. The key feature of all embodiments of the novel oscillating weight of the present invention, is an internal cavity defined along the length of the weight and in the same plane as the direction of the weight's oscillating motion, and a freely moving acceleration element located in the cavity, that moves within the cavity from one end of the weight to another, in response to a mechanical disturbance (i.e. motion) applied to the oscillating weight. The independent motion of the acceleration element greatly increases the acceleration and momentum of the oscillating weight, and enables a greater range of radial motion as well as a significantly lower motion threshold for the weight.

The various embodiments of the inventive oscillating weight, also include an elongated connector for connecting the weight body to a pivot element (e.g., pivot element 22 of FIG. 1) to deliver reciprocating radial motion to a motion conversion component (e.g., motion conversion component 24 of FIG. 1). The length of the connector should be selected along with the size of the weight's body to maximize the acceleration capabilities and range of motion of the weight subject to the size constraints of the KEPG 10 or KEPG 70. The shape of the weight's body is preferably configured to maximize the effectiveness of the acceleration element and to elongate the internal cavity to provide the acceleration element with a available range of motion and to also enhance the overall acceleration capabilities of the weight. Generally semicircular (or equivalent) shapes have been shown to provide desirable characteristics. The weight is preferably composed of any dense material that increases its mass and weight (and thus improves its acceleration capabilities).

Finally, even though the various embodiments of the oscillating weight 20 of FIG. 1 are described with reference to utilization of the weight 20 in the various embodiments of the present invention, it should be understood that the weight 20 may be readily utilized in any oscillating weight-based KEPG as a replacement for a conventional oscillating weight to thus greatly improve the performance of the modified KEPG.

Figure 4A:
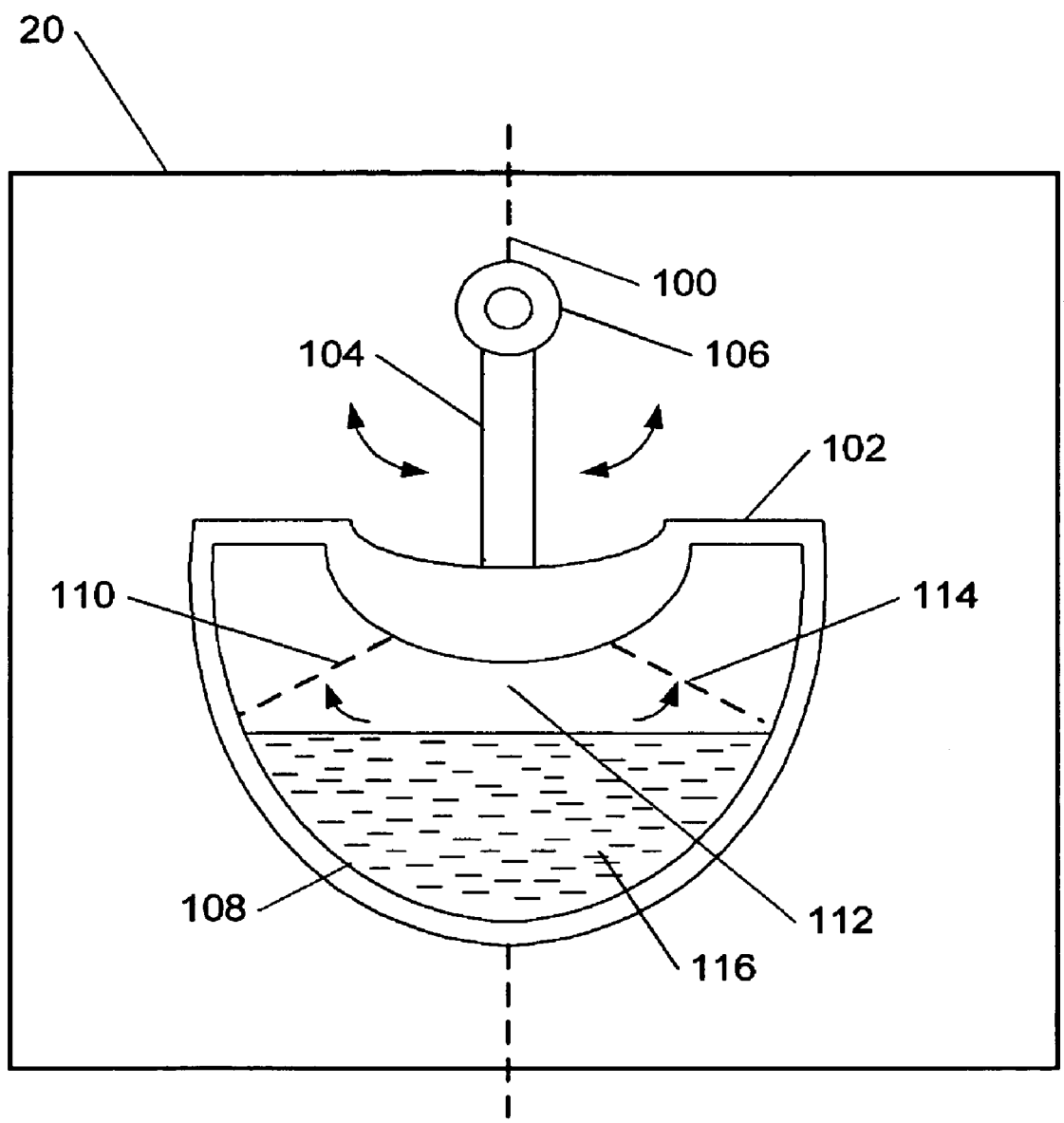
FIG. 4A is a schematic diagram of an exemplary first embodiment of the novel oscillating weight, including an internal cavity with a mobile acceleration element therein, that may be utilized in the systems shown in FIGS. 1–3, and 12, shown in a stationary position when the oscillating weight has not been subjected to a mechanical disturbance.
Figure 4B:
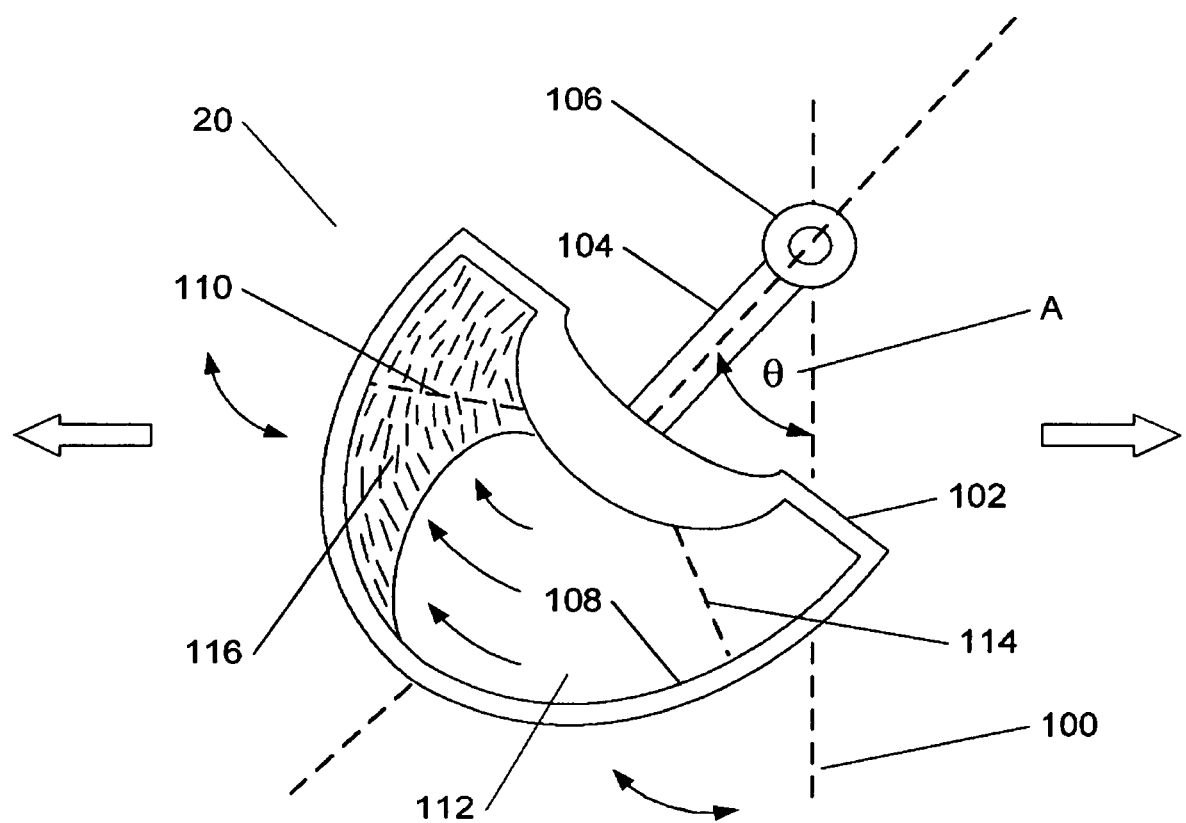
FIG. 4B is a schematic diagram of the novel oscillating weight of FIG. 4A, shown in an angularly displaced position when the oscillating weight has been subjected to a mechanical disturbance.

Referring now to FIGS. 4A and 4B, a first embodiment of the oscillating weight 20 is shown. In FIG. 4A the oscillating weight 20 is shown in a stationary position, along an axis 100, when the oscillating weight 20 has not been subjected to a mechanical disturbance, while in FIG. 4B, the oscillating weight 20 is shown in an exemplary angularly displaced position when the oscillating weight has been subjected to a mechanical disturbance, along an axis 118 that is at an angle A with respect to the axis 100.

The oscillating weight 20 includes a weight body 102, a pivot coupling 106 for connection to the pivot element 22 (of FIG. 1), and an elongated connector 104 connected between the body 102 at one end, and the pivot coupling 106 at the other end. An internal cavity 108, positioned within the body 102, includes a first region 110, and a second region 114, corresponding to the first and second directions in which the weight 20 is capable of oscillating, and a central region 112, between the first and second regions 110, 114, that is generally aligned with the longitudinal axis of the elongated connector 104. The oscillating weight 20, also includes an acceleration element 116, for example, a heavy fluid, such as mercury, or a mixture of dense substance (metal, glass, crystal, ceramic, or stone) or a combination of both.

The volume of the acceleration element 116, with respect to the volume of the cavity 108, as well as the size and shape of the cavity 108, should be selected to enable the acceleration element 116 to freely flow between regions 110 and 114 in response to a mechanical disturbance applied to the oscillating weight 20, and to thus increase the likelihood of occurrence of oscillating motion (i.e., lowering the motion threshold) as well as the frequency of attainment of a high value of the angle A.

The presence and value of repeated variations of the angle A that may be achieved by an oscillating weight (i.e. the likelihood, frequency, and range of oscillating motion), in response to a mechanical disturbance applied to the weight is proportional to the efficacy of the KEPG utilizing the oscillating weight. The novel oscillating weight 20 is capable of achieving a far greater value of repeated variations of the angle A than any previously known oscillating weight.

Figure 5:
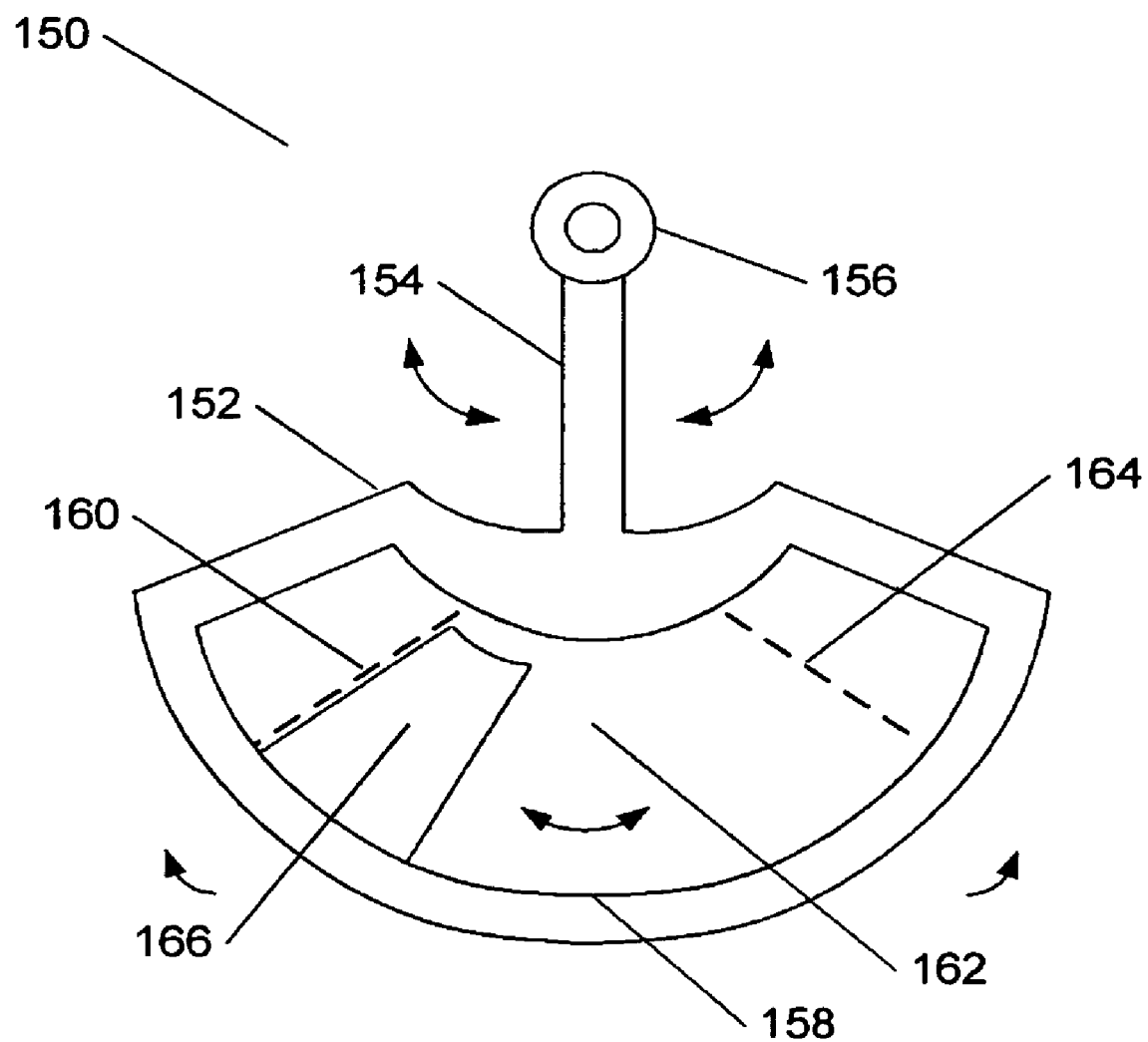
FIG. 5 is a schematic diagram of an exemplary second embodiment of the novel oscillating weight that may be utilized in the systems shown in FIGS. 1–3, and 12.

Referring now to FIG. 5, a second embodiment of the oscillating weight 20 is shown as an oscillating weight 150. The oscillating weight 150 includes a weight body 152, a pivot coupling 156 for connection to the pivot element 22 (of FIG. 1), and an elongated connector 154 connected between the body 152 at one end, and the pivot coupling 106 at the other end. An internal cavity 158, positioned within the body 152, includes a first region 160, and a second region 164, corresponding to the first and second directions in which the weight 150 is capable of oscillating, and a central region 162, between the first and second regions 160, 164, that is generally aligned with the longitudinal axis of the elongated connector 154. The oscillating weight 150, also includes an acceleration element 166, for example, one or more sliding elements composed of a dense substance (e.g. metal, glass, crystal, ceramic, or stone) or of a combination of two or more dense substances). The acceleration element 166 is preferably shaped, sized, and configured to freely slide between regions 160 and 164 in response to a mechanical disturbance applied to the oscillating weight 150, and to thus increase the likelihood of occurrence of oscillating motion (i.e. lowering the motion threshold) as well as the frequency of attainment of a high value of the angle A.

Figure 6:
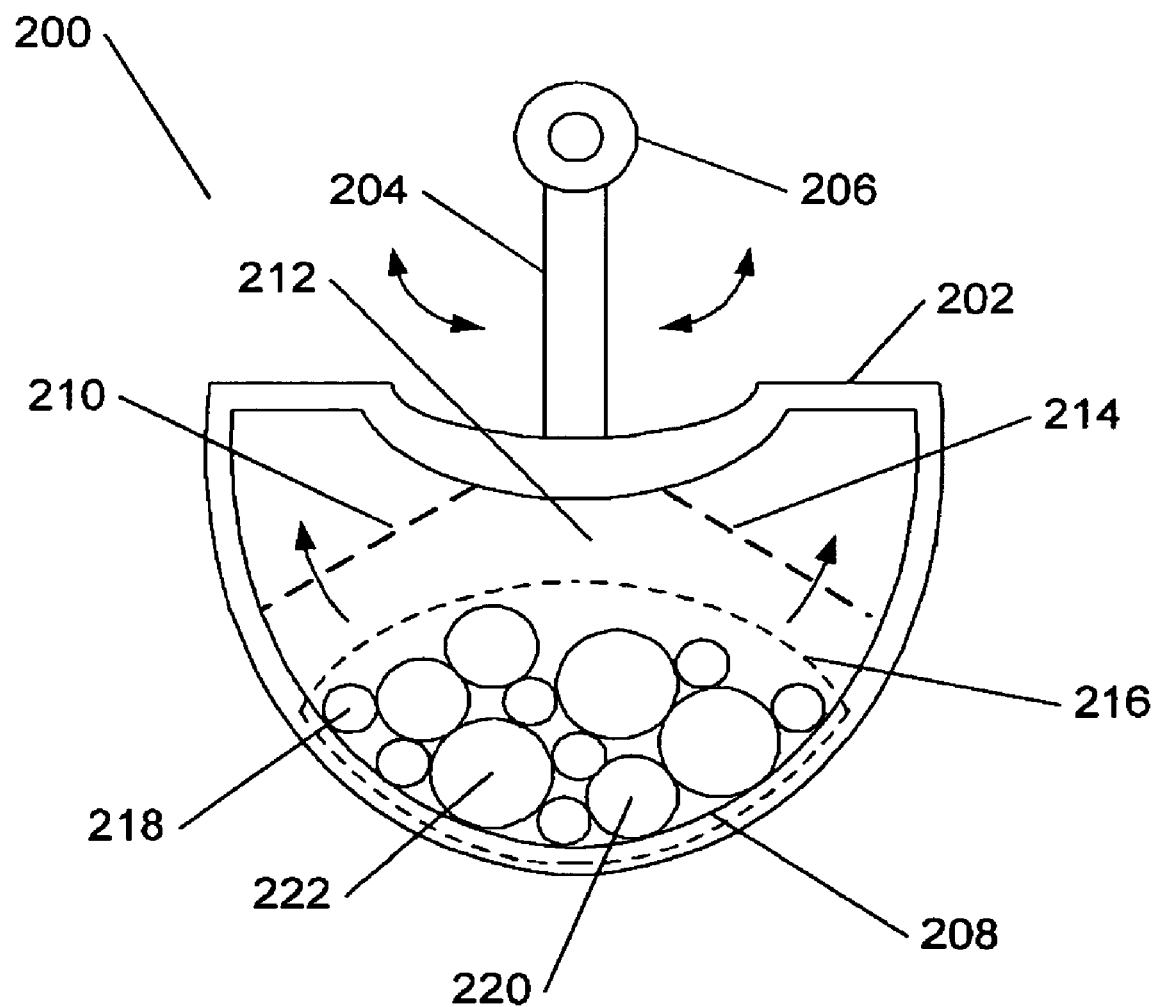
FIG. 6 is a schematic diagram of an exemplary third embodiment of the novel oscillating weight that may be utilized in the systems shown in FIGS. 1–3, and 12.

Referring now to FIG. 6, a third embodiment of the oscillating weight 20 is shown as an oscillating weight 200. The oscillating weight 200 includes a weight body 202, a pivot coupling 206 for connection to the pivot element 22 (of FIG. 1), and an elongated connector 204 connected between the body 202 at one end, and the pivot coupling 206 at the other end. An internal cavity 208, positioned within the body 202, includes a first region 210, and a second region 214, corresponding to the first and second directions in which (he weight 200 is capable of oscillating, and a central region 212, between the first and second regions 210, 214, that is generally aligned with the longitudinal axis of the elongated connector 204. The oscillating weight 200, also includes an acceleration element 216, for example, one or more rolling elements composed of a dense substance (e.g. metal, glass, crystal, ceramic, or stone) or of a combination of two or more dense substances). The rolling elements may be disks, spheres, or a combination of both, of similar or of different sizes. For example, the acceleration element 216 may include a sphere 218, a disk 220, and a larger disk 222.

The rolling elements of the acceleration element 216 are preferably shaped, sized, and configured, and quantities thereof selected, to freely roll between regions 210 and 214 in response to a mechanical disturbance applied to the oscillating weight 200, and to thus increase the likelihood of occurrence of oscillating motion (i.e., lowering the motion threshold) as well as the frequency of attainment of a high value of the angle A.

Figure 7:
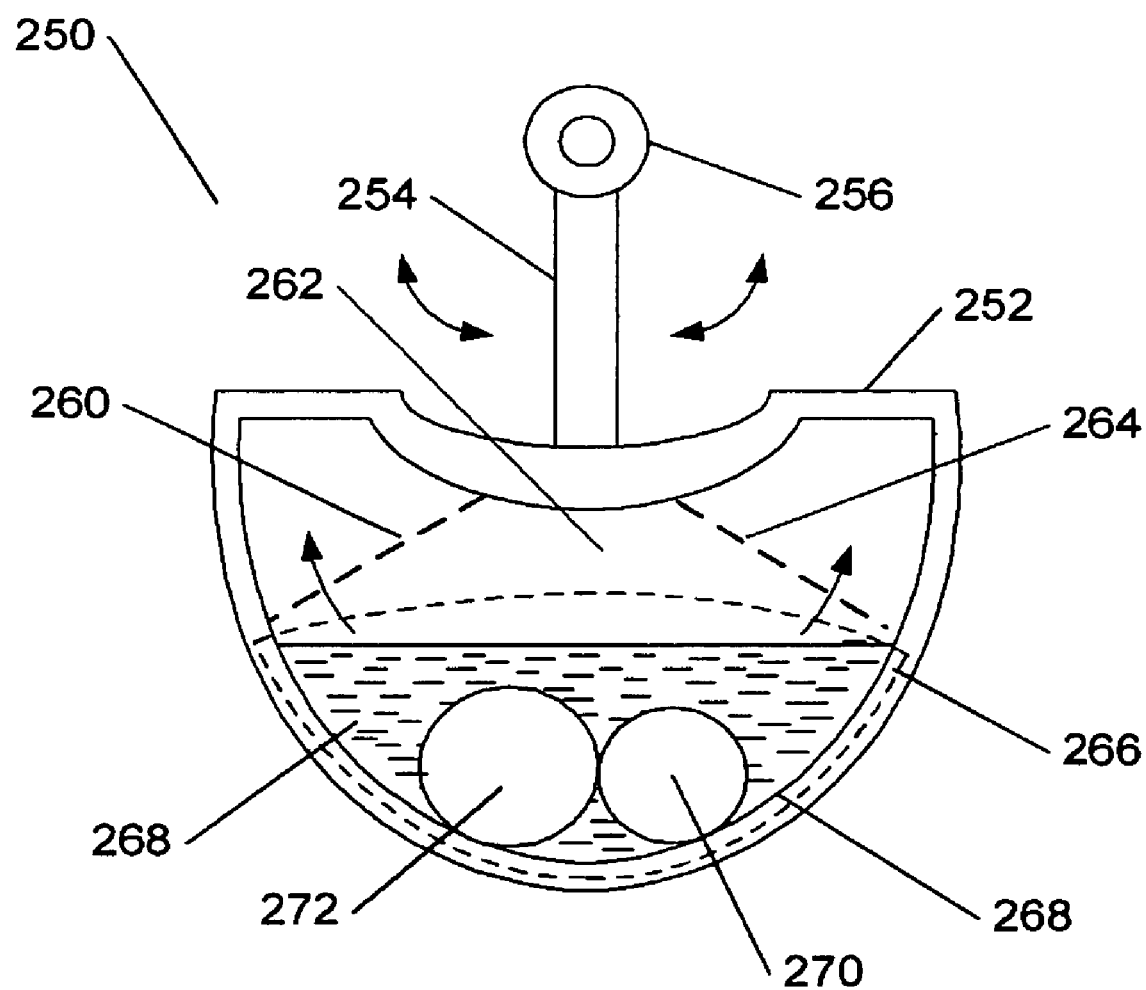
FIG. 7 is a schematic diagram of an exemplary fourth embodiment of the novel oscillating weight that may be utilized in the systems shown in FIGS. 1–3, and 12.

Referring now to FIG. 7, a fourth embodiment of the oscillating weight 20 is shown as an oscillating weight 250. The oscillating weight 250 includes a weight body 252, a pivot coupling 256 for connection to the pivot element 22 (of FIG. 1), and an elongated connector 254 connected between the body 252 at one end, and the pivot coupling 256 at the other end. An internal cavity 258, positioned within the body 252, includes a first region 260, and a second region 264, corresponding to the first and second directions in which the weight 250 is capable of oscillating, and a central region 262, between the first and second regions 260, 264, that is generally aligned with the longitudinal axis of the elongated connector 254. The oscillating weight 250, also includes an acceleration element 266, for example, one or more rolling elements 270, 272, composed of a dense substance (e.g. metal, glass, crystal, ceramic, or stone) or of a combination of two or more dense substances) disposed within a heavy fluid 268. The rolling elements 270, 272, may be disks, spheres, or a combination of both, of similar or of different sizes. For example, the rolling element 270 may be a sphere, while the rolling element 272 may be a disk.

The acceleration element 266 is preferably shaped, sized, and configured to freely move between regions 260 and 264 in response to a mechanical disturbance applied to the oscillating weight 250, and to thus increase the likelihood of occurrence of oscillating motion (i.e., lowering the motion threshold) as well as the frequency of attainment of a high value of the angle A.

Referring now to FIGS. 8–11, various decorative embodiments of the oscillating weight 20 are shown. The decorative embodiments are advantageous if the KEPG and the device incorporating the KEPG are configured to enable viewing of the oscillating weight during operation. An attractively designed oscillating weight visible to the user of an electrical device improves the appearance of the device and may improve the marketability and selling price thereof.

Figure 8:
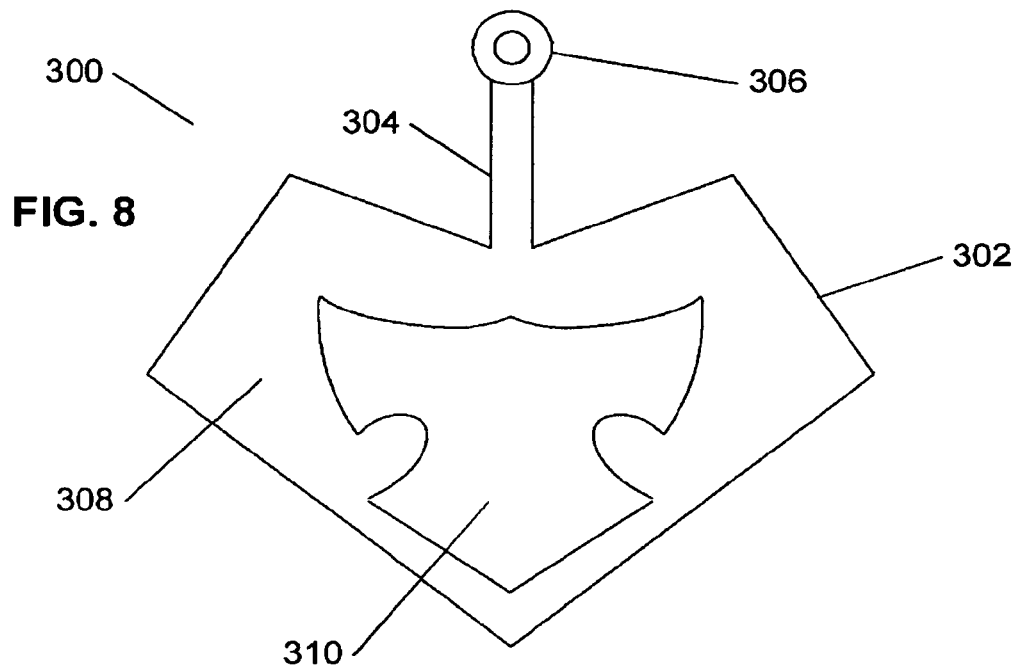
FIG. 8 is a schematic diagram of an exemplary fifth embodiment of the novel oscillating weight that may be utilized in the systems shown in FIGS. 1–3, and 12, including one or more decorative elements positioned on the weight's surface.

Referring now to FIG. 8, a fifth embodiment of the oscillating weight 20 is shown as an oscillating weight 300. The oscillating weight 300 includes a weight body 302, a pivot coupling 306 for connection to the pivot element 22 (of FIG. 1), and an elongated connector 304 connected between the body 302 at one end, and the pivot coupling 306 at the other end. Advantageously, the oscillating weight 300 also includes one or more decorative elements 310, positioned on a visible surface 308 of the weight body 302. The element(s) 310 may be abstract sculpted elements, or specific (e.g., symbol, text, logo, creature, or object) sculpted elements.

Figure 9:
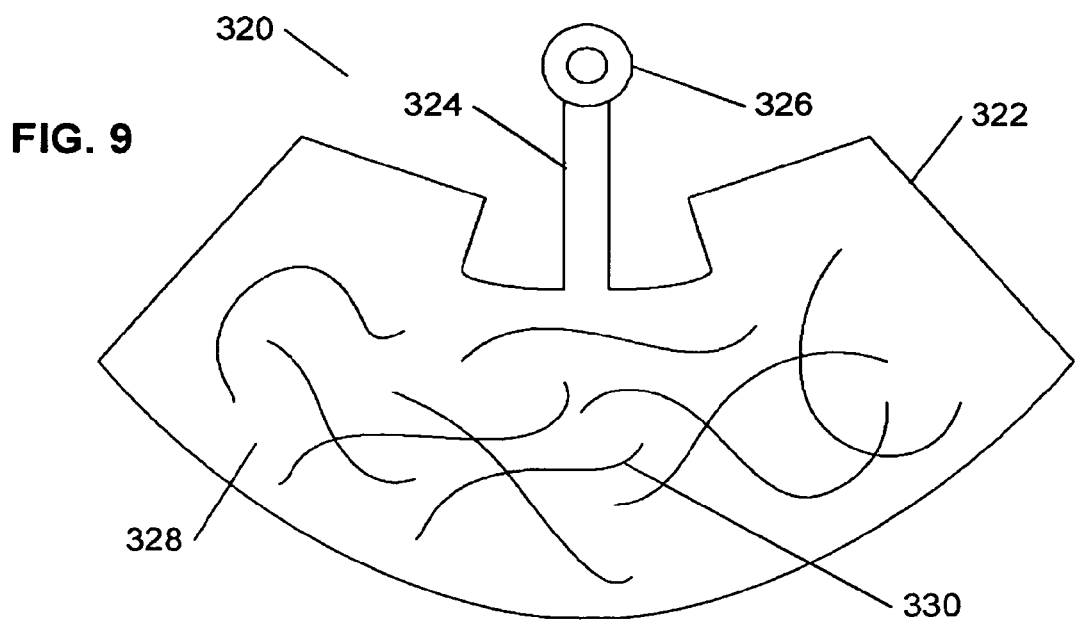
FIG. 9 is a schematic diagram of an exemplary sixth embodiment of the novel oscillating weight that may be utilized in the systems shown in FIGS. 1–3, and 12, including one or more decorative designs defined on the weight's surface.

Referring now to FIG. 9, a sixth embodiment of the oscillating weight 20 is shown as an oscillating weight 320. The oscillating weight 320 includes a weight body 322, a pivot coupling 326 for connection to the pivot element 22 (of FIG. 1), and an elongated connector 324 connected between the body 322 at one end, and the pivot coupling 326 at the other end. Advantageously, the oscillating weight 320 also includes one or more decorative designs 330, positioned on a visible surface 328 of the weight body 322. The designs 330 may be abstract designs, or specific designs (e.g., symbol(s), text, logo, pictures, or photographs, color and/or black and white).

Referring now to FIG. 10, a seventh embodiment of the oscillating weight 20 is shown as an oscillating weight 340. The oscillating weight 340 includes a weight body 342, a pivot coupling 346 for connection to the pivot element 22 (of FIG. 1), and an elongated connector 344 connected between the body 342 at one end, and the pivot coupling 346 at the other end. Advantageously, the oscillating weight 340 also includes a decorative visible surface 348 on the weight body 342. The decorative surface 348 may be a layer of precious or semi-precious material, or it may be of a solid color.

Referring now to FIG. 11, an eight embodiment of the oscillating weight 20 is shown as an oscillating weight 360. The oscillating weight 360 includes a weight body 362, a pivot coupling 366 for connection to the pivot element 22 (of FIG. 1), and an elongated connector 364 connected between the body 362 at one end, and the pivot coupling 366 at the other end. Advantageously, the oscillating weight 360 also includes one or more decorative designs 370, positioned on a visible surface 368 of the weight body 362. The designs 370 may be abstract designs, or specific designs (e.g., symbol(s), text, logo, pictures, or photographs, color and/or black and white), and also includes one or more decorative elements 372, also positioned on the visible surface 368. The element(s) 372 may be abstract sculpted elements, or specific (e.g., symbol, text, logo, creature, or object) sculpted elements.

It should be noted that any of the oscillating weights 20, 150, 200, and 250 of FIGS. 4A to 7, may include, as a matter of design or artistic choice, one or more decorative features of the oscillating weights 300, 320, 340 and 360 of FIGS. 8–11, respectively.

The KEPGs 10 and 70 of FIGS. 1 and 3, provide many peripheral advantages as a result of their novel construction and operation, including, but not limited to:

Lower operating temperature than conventional portable device power supplies (especially fuel cells): This makes the novel KEPGs particularly suitable for military applications where low equipment temperatures can provide an increased defense against temperature-sensitive enemy surveillance, reconnaissance, and/or targeting;

Reduced reliance on conventional batteries and reduction of consumption of local utility electrical resources: The ability of the novel KEPGs 10, 70 to provide energy to power electrical devices and/or recharge device batteries from motion, reduce the need for conventional lead acid batteries which are environmentally unsafe and expensive to dispose when expended, as well as reduce the frequency with which users draw on local electrical utilities to recharge their electrical devices—a particularly important advantage in times when lower electrical energy consumption is highly desirable.

In addition, the KEPGs 10, 70 of the present invention can also further overcome the above-described challenges by being configured in novel advantageous arrangements utilizing, for example, multiple cooperating KEPGs, energy aggregating units, and recharge control units, to provide electrical energy to electrical devices, and/or device components, in a wide variety of useful configurations. The above-incorporated commonly assigned co-pending U.S. patent application entitled "APPARATUS AND METHOD FOR PROVIDING ELECTRICAL ENERGY GENERATED FROM MOTION TO AN ELECTRICALLY POWERED DEVICE" provides and describes, in FIGS. 1–13B and accompanying descriptions thereof, a wide variety of electrical devices, electrical device accessories, and articles and/or structures incorporating one or more electrical devices that advantageously utilize one or more KEPG 10 and/or 70 subsystems to provide, in response to motion, electrical energy to functional components thereof, in addition to, or instead of, other electrical energy sources, and, if the other energy sources are rechargeable, to continuously recharge the energy sources.

While many advantageous and novel techniques for utilizing the KEPG 10 and/or 70 are shown in FIGS. 1–13B of the above-incorporated patent application, it would be useful to show and describe an exemplary simplified embodiment of an electrical device advantageously utilizing the KEPG 10 and/or 70.

Figure 12:
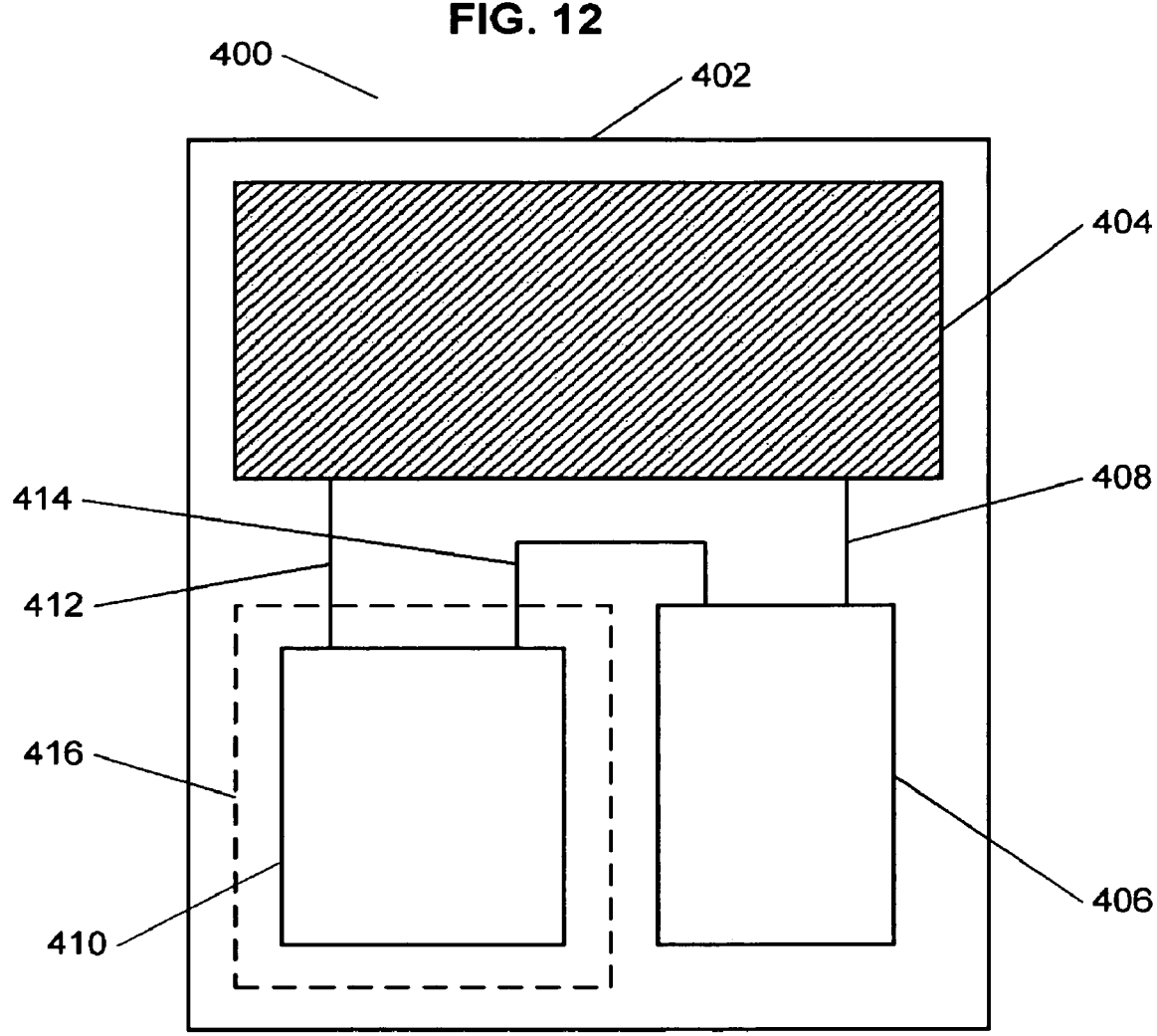
FIG. 12 is a schematic block diagram of an exemplary embodiment of an inventive electrical device incorporating the inventive KEPG system, for generating, storing, and/or delivering electrical energy to the functional components of the device.

Referring now to an exemplary FIG. 12, an exemplary embodiment of an inventive electrical device incorporating the inventive KEPG 10 and/or KEPG 70 is shown as an electrical device 400. The electrical device 400 may be any electrical device of any size that performs one or more functions and that requires electrical energy for operation. Thus, the electrical device 400 may be a miniature device, such as a pacemaker, a small device, such as a digital camera, a medium device, such as a notebook computer, or a large device such as a portable medical diagnostic unit.

The electrical device 400 includes a housing 402, a functional component 404 (which optionally may include two or more functional sub-components) for performing the intended functions of the device 400, a KEPG 410 for providing electrical energy to the functional component 404 in response to motion of the device 400 through a power link 412, and an optional power supply 406 for providing electrical energy to the functional component 404 under pre-defined conditions, for example, when the device 400 is immobile. If the power supply 406 is rechargeable, an optional recharge link 414 may be provided to electrically connect the KEPG 410 to the power supply 406, so that the KEPG 410 may selectively recharge the power supply 406.

The housing 402, may be any casing sized, shaped and constructed in accordance with the specific type of the device 400, and may be composed of any suitable material or group of materials. If the KEPG 410 is provided with a viewing area (such as the viewing area 42 of FIG. 1) for viewing the oscillating weight of the KEPG 410 (for example, if the weight includes one or more decorative features in accordance with the FIGS. 8–11), the housing 402, may also include an optional viewing window 416 on its surface, and aligned with the viewing area of the KEPG 410 to enable the user of the device 400 to view the KEPG 410 in operation.

The functional component 404, is essentially any component or group of components other than a power supply than performs the intended function of the device 400. For example, if the device 400 is a basic mobile telephone, the functional component 400 would include at least the following sub-components: the keypad and other buttons, the microprocessors and related elements, the memory, the headphone port, the screen, the speaker and microphones, and the antenna and related elements. The KEPG 410 is preferably the KEPG 10 (FIG. 1) if the device 400 is miniature, and KEPG 10 or the KEPG 70 (FIG. 3) if the device 400 is small or larger. The power supply 406 may be any conventional power storage supply, such as a battery or a capacitor device, and is preferably rechargeable. Alternately, if the power supply 406 is not rechargeable, it may be any form of a generator, such as a solar-based generator, a wind-based generator, or a hydro-based device. These generators typically require additional components to collect the energy that is converted into electrical energy (e.g., a solar panel for the solar-based generator, etc.).

The utilization of the electrical energy provided by the KEPG 410 may be determined as a matter of design choice, without departing from the spirit of the invention. A specific utilization arrangement may be pre-determined for the device 400, or optionally, a specific arrangement may be selected by a sub-component of the functional component 404, such as a power management unit (not shown). In accordance with the present invention, at least the following inventive KEPG 410 utilization arrangements are contemplated:

The KEPG 410 continually provides electrical energy, generated from motion of the device 400, directly to the functional component 402 through the power link 412;

When the device 400 utilizes the power supply 406 as a primary source of electrical energy, the KEPG 410 accumulates and stores electrical energy, generated from motion of the device 400, and is only fed to the functional component 402 through the power link 412, when the power supply 406 is depleted or fails;

When the device 400 utilizes the power supply 406 as a primary source of electrical energy, and the power supply 406 is rechargeable, the KEPG 410 continually provides electrical energy, generated from motion of the device 400, to the power supply 406 through the recharge link 414, to recharge the power supply 406. When the power supply 406 is at full capacity, the KEPG 410, optionally accumulates and stores electrical energy, generated from motion of the device 400, and only feeds it to the power supply 406, when it becomes depleted, and The KEPG 410 continually provides a first portion of electrical energy, generated from motion of the device 400, directly to at least a portion of the functional component 402 through the power link 412, and, when the power supply 406 is rechargeable, the KEPG 410 continually provides a second portion of electrical energy, generated from motion of the device 400, to the power supply 406 through the recharge link 414, to recharge the power supply 406. When the power supply 406 is at full capacity, the KEPG 410, optionally accumulates and stores electrical energy, generated from motion of the device 400, and only feeds it to the power supply 406, when it becomes depleted.

Similarly to their above-described use in the electrical device 400, the KEPG 10 and KEPG 70 may be advantageously utilized as power supplies conjunction with electrically-powered devices of various sizes (from miniature to large) and with a wide variety of functional components, including, but not limited to, the following:

an implantable medical device (pacemaker, defibrillator, drug pump);

a wrist or pocket chronograph;

a concealable surveillance device (hidden camera, tracking tag, microphone, hidden motion sensing device, etc.);

an electronic tag (RF, etc.);

a personal electronic device, such as: a mobile telephone, a radio, a television, a personal digital assistant (PDA), a media player and/or recorder, a video or photo camera, a game console, binoculars, night vision goggles;

a portable computer, such as a notebook, laptop, or tablet computer);

a portable data acquisition device (i.e. RF or barcode scanner);

a portable medical diagnostic or treatment delivery device (e.g. blood pressure monitor, electrocardiogram machine, defibrillator, drug pump, etc.);

a surveillance device (remote camera, microphone, motion sensing device, etc.);

a weapon or weapon accessory with electrical or electronic capabilities (e.g. a camera and/or scope on a rifle);

a taser;

a laser targeting sight, or a laser targeter;

a toy;

a robotic device; and a vehicle (watercraft, glider, etc.)

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

I claim:

1. An apparatus for generating electrical energy in response to repetitive external motion applied thereto, comprising:

a support structure;

a pivot element, disposed within said support structure, and pivotably connected thereto;

a rigid oscillating weight, disposed within said support structure, having a first side, a second side, a top portion connected to said pivot element, and a bottom portion, said oscillating weight being configured and operable to achieve oscillating motion in an angular range perpendicular to a longitudinal axis of said pivot element, in response to the repetitive external motion applied to said support structure, said pivot element being operable to produce a reciprocating radial motion thereof, in response to said oscillating motion of said oscillating weight;

a mobile system, disposed within said oscillating weight, operable to initiate said oscillating motion in response to the repetitive external motion, and to extend a duration of said oscillating motion when the repetitive external motion is not applied to said support structure, comprising:

an internal cavity defined within said oscillating weight between said first and second sides and between said top and bottom portions, said internal cavity having a first region proximal to said first side, a second region proximal to said second side, and a central region defined between said first and second regions; and at least one mobile element movably disposed within said cavity, said at least one mobile element operable to freely move within said cavity, through said central region and between said first and second regions, in response to the repetitive external motion applied to said support structure, such that a likelihood and duration of said reciprocating radial motion of said pivot element is increased, thereby increasing a likelihood of rotational motion;

motion conversion means, connected to said pivot element, for translating said reciprocating radial motion into a rotational motion of a first velocity; and electromechanical transducer means, connected to said motion conversion means, for generating electrical energy in response to said rotational motion applied by said motion conversion means thereto.

2. The apparatus of claim 1, wherein said support structure comprises at least one of: a frame, and a housing.

3. The apparatus of claim 1, wherein said pivot element is rotably supported by a portion of said support structure.

4. The apparatus of claim 1, wherein the repetitive external motion comprises an inertial disturbance applied to said support structure, said inertial disturbance comprising a plurality of inertial forces exerted on said support structure in a plurality of directions, said plural inertial forces having at least one force magnitude that causes oscillating motion of said oscillating weight sufficient to cause said pivot element to produce reciprocating radial motion, that, when translated into said rotational motion by said motion conversion means, is sufficient to cause said electromechanical transducer means to generate electrical energy in response to said rotational motion imparted thereto.

5. The apparatus of claim 1, wherein said support structure comprises a first region and a second region, and wherein said oscillating motion comprises repetitive movement of said oscillating weight, between a first position, proximal to said first region of said support structure, and a second position, proximal to said second region of said support structure.

6. The apparatus of claim 1, wherein said at least one mobile element is sized and configured to freely move within said internal cavity of said oscillating weight, and wherein said at least one mobile element comprises at least one of:

a heavy fluid; a mixture of a plurality of grains, each of said plural grains being composed of a first dense substance; at least one rolling element composed of a second dense substance; and at least one sliding element composed of a third dense substance.

7. The apparatus of claim 6, wherein said heavy fluid comprises physical properties substantially equivalent to mercury.

8. The apparatus of claim 6, wherein said first, second, and third dense substances are selected from a group consisting of: metal, glass, crystal, ceramic, and stone.

9. The apparatus of claim 6, wherein each said at least one rolling element comprises a disc.

10. The apparatus of claim 6, wherein each said at least one rolling element comprises a sphere.

11. The apparatus of claim 6, wherein each said at least one sliding element comprises a geometric shape sized and configured to freely slide within said internal cavity.

12. The apparatus of claim 1, wherein said oscillating weight further comprises an elongated connector of a first length, and having a first end and a second end, said first end of said elongated connector being connected to a center of said top portion, and said second end being connected to said pivot element.

13. The apparatus of claim 12, wherein said first length of said elongated connector is sized to facilitate said oscillating motion of said oscillating weight in response to said motion of said support structure.

14. The apparatus of claim 1, wherein said support structure comprises a transparent viewing region for viewing said oscillating weight, wherein said oscillating weight comprises a first outer surface proximal to said viewing region, and wherein said oscillating weight is of a predefined geometric shape.

15. The apparatus of claim 14, wherein said predefined geometric shape is selected to achieve an aesthetically decorative appearance.

16. The apparatus of claim 14, wherein said oscillating weight further comprises at least one of: a layer of a precious or semi-precious material covering at least a portion of said first outer surface, at least one decorative element positioned on said first outer surface, and at least one decorative design imposed on said first outer surface.

17. The apparatus of claim 1, wherein said motion conversion means comprise a gear assembly having an input drive element and an output drive element, wherein said pivot element is connected to said input drive element and said electromechanical transducer means is connected to said output drive element, said gear assembly being operable to convert reciprocating radial motion imposed on said input drive element by said pivot element, into rotational motion at said output drive element.

18. The apparatus of claim 1, wherein said electromechanical transducer means comprise:
a conductive coil with an open central region; and
a magnetized element disposed within said open central region, wherein one of said conductive coil and said magnetized element are connected to said motion conversion means, such that when said motion conversion means delivers rotational motion thereto, said resulting rotation of said conductive coil and said magnetic element with respect to one another induces electrical energy in said conductive coil.

19. The apparatus of claim 18, wherein said conductive coil comprises:
a ring having an outer surface and a central circumferential axis;
a conductive wire wound in a plurality of loops on said outer surface and around said central circumferential axis.

20. The apparatus of claim 19, wherein said magnetized element comprises a ferromagnetic rotor sized to fit within said open central region within said wire-wound ring, wherein said ring, said conductive wire, and said ferromagnetic rotor are sized, positioned, and configured to maximize said induced electrical energy during rotation of said ferromagnetic rotor and said wire-wound ring with respect to one another.

21. The apparatus of claim 18, wherein said conductive coil comprises:
a hollow tube having an outer surface, a circumferential axis, and a longitudinal central axis;
a conductive wire wound in a plurality of loops on said outer surface and around said circumferential axis.

22. The apparatus of claim 21, wherein said magnetized element comprises an elongated ferromagnetic rotor sized to fit within said open central region within said wire-wound hollow tube along said longitudinal central axis, wherein said hollow tube, said conductive wire, and said elongated ferromagnetic rotor are sized, positioned, and configured to maximize said induced electrical energy during rotation of said ferromagnetic rotor and said wire-wound hollow tube with respect to one another.

23. The apparatus of claim 1, further comprising electrical energy processing means, connected to said electromechanical transducer means, for modifying said electrical energy generated therefrom.

24. The apparatus of claim 23, wherein said electrical energy processing means comprises at least one of: a rectification unit operable to rectify said electrical energy, and a transformer operable to convert said electrical energy to correspond to at least one predetermined parameter.

25. The apparatus of claim 24, wherein said at least one predefined parameter comprises a voltage magnitude.

26. The apparatus of claim 23, further comprising a first power interface, connected to said electrical energy processing means, operable to deliver said modified electrical energy to an electrical energy consuming device.

27. The apparatus of claim 23, further comprising electrical energy storage means for storing said modified electrical energy.

28. The apparatus of claim 27, further comprising a second power interface, connected to said electrical energy storage means, operable to deliver said modified electrical energy to said electrical energy consuming device, in response to said electrical energy consuming device drawing said modified electrical energy.

29. The apparatus of claim 23, wherein said electrical energy processing means further comprises recharging means for converting said modified electrical energy into a format suitable for recharging at least one rechargeable battery external to said support structure, further comprising a third power interface, operable to connect said recharging means to said at least one rechargeable battery, and to deliver said converted electrical energy to recharge said at least one rechargeable battery.

30. The apparatus of claim 1, wherein a quantity of said electrical energy generated by said electromechanical transducer means is proportional to said first velocity of said rotational motion delivered thereto.

31. The apparatus of claim 30, further comprising:
at least one additional pivot element;
at least one additional rigid oscillating weight, disposed within said support structure, each having a second top portion connected to a corresponding said at least one additional pivot element, and a second bottom portion, said at least one additional oscillating weight being configured and operable to achieve additional oscillating motion in said angular range perpendicular to a longitudinal axis of said pivot element, in response to the repetitive external motion applied to said support structure, each said at least one additional pivot element being operable to produce said reciprocating radial motion thereof, in response to said oscillating motion of corresponding each said at least one additional oscillating weight;
at least one additional mobile system, disposed within a corresponding said at least one additional oscillating weight, operable to initiate said additional oscillating motion in response to the repetitive external motion, and to extend a duration of said additional oscillating motion when the repetitive external motion is not being applied to said support structure; and
wherein said motion conversion means comprises means for aggregating and translating said reciprocating radial motion of each of said pivot element and said at least one additional pivot element into said rotational motion.

32. The apparatus of claim 31, wherein said means for aggregating and translating comprises:
a combination and conversion gear assembly having a plurality of input drive elements, wherein said pivot element and each said at least one additional pivot element are connected to a corresponding plural input drive element, and having a primary output drive element, wherein said electromechanical transducer means is connected to said primary output drive element, said combination and conversion gear assembly being operable to convert reciprocating radial motion imposed on each said plural input drive element by said corresponding pivot element, and said corresponding at least one additional pivot element, into rotational motion at said output drive element.

33. An apparatus for generating electrical energy in response to repetitive external motion applied thereto, comprising:
a housing;
a plurality of kinetic electrical generators, disposed within said housing, each said plural kinetic electrical generator comprising:
a support structure;
a pivot element, disposed within said support structure, and pivotably connected thereto;
a rigid oscillating weight, disposed within said support structure, having a first side, a second side, a top portion connected to said pivot element, and a bottom portion, said oscillating weight being configured and operable to achieve oscillating motion in an angular range perpendicular to a longitudinal axis of said pivot element, in response to the repetitive external motion applied to said support structure, said pivot element being operable to produce a reciprocating radial motion thereof, in response to said oscillating motion of said oscillating weight;
a mobile system, disposed within said oscillating weight, operable to initiate said oscillating motion in response to the repetitive external motion, and to extend a duration of said oscillating motion when the repetitive external motion is not applied to said support structure, comprising:
an internal cavity defined within said oscillating weight between said first and second sides and between said top and bottom portions, said internal cavity having a first region proximal to said first side, a second region proximal to said second side, and a central region defined between said first and second regions; and
at least one mobile element movably disposed within said cavity, said at least one mobile element operable to freely move within said cavity, through said central region and between said first and second regions, in response to the repetitive external motion applied to said support structure, such that a likelihood and duration of said reciprocating radial motion of said pivot element is increased, thereby increasing a likelihood of rotational motion;
motion conversion means, connected to said pivot element, for translating said reciprocating radial motion into a rotational motion of a first velocity;
electromechanical transducer means, connected to said motion conversion means, for generating electrical energy in response to said rotational motion applied by said motion conversion means thereto; and
electrical output means for transferring said generated electrical energy from said electromechanical transducer means; and
an electrical energy aggregation unit, connected to said electrical output means of each said plural kinetic electrical generator, operable to aggregate said electrical energy received from each said electrical output means.

34. The apparatus of claim 33, wherein each said plural support structure comprises a first region and a second region and wherein said oscillating motion comprises repetitive movement of each said plural oscillating weight, between a first position, proximal to said first region of a corresponding plural support structure, and a second position, proximal to said second region of said corresponding plural support structure.

35. The apparatus of claim 33, further comprising electrical energy processing means, connected to said electrical energy aggregation unit, for modifying said aggregated electrical energy.

36. The apparatus of claim 35, wherein said electrical energy processing means comprises at least one of: a rectification unit operable to rectify said aggregated electrical energy, and a transformer operable to convert said aggregated electrical energy to correspond to at least one predetermined parameter.

37. The apparatus of claim 35, further comprising a first power interface, connected to said electrical energy processing means, operable to deliver said modified aggregated electrical energy to an electrical energy consuming device external to said housing.

38. The apparatus of claim 35, further comprising electrical energy storage means for storing said modified aggregated electrical energy.

39. The apparatus of claim 38, further comprising a second power interface, connected to said electrical energy storage means, operable to deliver said modified aggregated electrical energy to an electrical energy consuming device external to said housing, in response to said electrical energy consuming device drawing said modified aggregated electrical energy.

40. The apparatus of claim 35, wherein said electrical energy processing means further comprises recharging means for converting said modified aggregated electrical energy into a format suitable for recharging at least one rechargeable battery external to said housing, further comprising a third power interface, operable to connect said recharging means to said at least one rechargeable battery, and to deliver said converted electrical energy to recharge said at least one rechargeable battery.

41. The apparatus of claim 40, wherein said at least one rechargeable battery is disposed in an electrical device, external to said housing, said electrical device having a recharge coupling input and being positioned within a predetermined distance of said housing, wherein said third power interface comprises an elongated wire of a predetermined length, having a first end connected to said recharging means and a second end connected to a recharge coupling output sized and configured to releasably connect to said recharge coupling input of said electrical device, wherein when said predetermined distance is no greater than said predetermined length, said electrical device is operable to: selectively connect to said recharging means through said third power interface to receive said converted electrical energy and to thereby recharge said at least one rechargeable battery.

42. A method for generating electrical energy in response to repetitive external motion applied thereto, comprising the steps of:
- (a) providing a support structure, at least one pivot element disposed within said support structure, and pivotably connected thereto, at least one rigid oscillating weight, disposed within said support structure, each said at least one said oscillating weight having a first side, a second side, a top portion, connected to a corresponding said at least one pivot element and a bottom portion,
- (b) applying the repetitive external motion to said support structure;
- (c) producing, by said at least one oscillating weight, oscillating motion in an angular range perpendicular to a longitudinal axis of said at least one pivot element, in response to said repetitive external motion, wherein each said at least one oscillating weight is provided with an internally disposed mobile system, operable to initiate said oscillating motion in response to the repetitive external motion, and to extend a duration of said oscillating motion when the repetitive external motion is not applied to said support structure, said mobile system comprising:
  - an internal cavity defined within said oscillating weight between said first and second sides and between said top and bottom portions, said internal cavity having a first region proximal to said first side, a second region proximal to said second side, and a central region defined between said first and second regions; and
  - at least one mobile element movably disposed within said cavity, said at least one mobile element operable to freely move within said cavity, through said central region and between said first and second regions, in response to the repetitive external motion applied to said support structure, such that a likelihood and duration of said reciprocating radial motion of said pivot element is increased, thereby increasing likelihood of said rotational motion;
- (d) producing, by said at least one pivot element, reciprocating radial motion along said longitudinal axis thereof, in response to said oscillating motion of said at least one oscillating weight;
- (e) translating, by a motion conversion unit connected to said at least one pivot element, said reciprocating radial motion into a rotational motion of a first velocity; and
- (f) generating, by an electromechanical transducer connected to said motion conversion unit, electrical energy in response to said rotational motion applied by said motion conversion unit thereto.

* * * * *